United States Patent
Uchiyama et al.

(10) Patent No.: US 6,565,974 B1
(45) Date of Patent: May 20, 2003

(54) RETARDATION FILM AND OPTICAL DEVICE EMPLOYING IT

(75) Inventors: Akihiko Uchiyama, Hino (JP); Takashi Kushida, Hino (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/582,756

(22) PCT Filed: Oct. 29, 1999

(86) PCT No.: PCT/JP99/06057

§ 371 (c)(1),
(2), (4) Date: Jun. 30, 2000

(87) PCT Pub. No.: WO00/26705

PCT Pub. Date: May 11, 2000

(30) Foreign Application Priority Data

Oct. 30, 1998 (JP) .......................................... 10-310371
Nov. 5, 1998 (JP) .......................................... 10-314761
Apr. 1, 1999 (JP) .......................................... 11-094846

(51) Int. Cl.$^7$ .............................................. B32B 27/36
(52) U.S. Cl. ...................................................... 428/412
(58) Field of Search ........................................ 428/412

(56) References Cited

FOREIGN PATENT DOCUMENTS

| JP | A-2-285304 | 11/1990 | |
| JP | A-3-29921 | 2/1991 | |
| JP | 4-116603 | 4/1992 | ............ G02B/5/30 |
| JP | 6-25398 | 2/1994 | |
| JP | 6-82624 | 3/1994 | ............ G02B/5/30 |
| JP | 7-287118 | 10/1995 | ............ G02B/5/30 |
| JP | 7-299828 | 11/1995 | ............ B29C/41/12 |
| JP | 8-57950 | 3/1996 | ............ B29C/55/12 |
| JP | 8-190094 | 7/1996 | ......... G02F/1/1335 |
| JP | 8-278410 | 10/1996 | ............ G02B/5/30 |
| JP | B-2609139 | 2/1997 | |
| JP | 9-189811 | 7/1997 | ............ G02B/5/30 |
| JP | A-10-68816 | 3/1998 | |
| JP | 10-68816 | 3/1998 | ............ G02B/5/30 |

OTHER PUBLICATIONS

Patent Abstract of Japan 08057950 A Mar. 5, 1996.
Patent Abstract of Japan 06082624 A Mar. 25, 1994.
Patent Abstract of Japan 07287118 A Oct. 31, 1995.
Patent Abstract of Japan 04116603 A Apr. 17, 1992.
Okada Toyokazu, "Catch Ball Between Polymer Science and Physics", *The Society of Polymer Science*, Nov. 30, 2000, with partial translation.
Hiroyuki Yoshimi, Characterization of Retardation Film Using Optical Analyzer "KOBRA", *Nitto Technical Report*, vol. 37 No. 2, pp. 35–36, Nov., 1999.

(List continued on next page.)

*Primary Examiner*—Terressa M. Boykin
(74) *Attorney, Agent, or Firm*—Sughrue Mion, PLLC

(57) ABSTRACT

A retardation film comprised of a single oriented polymer film, characterized in that the retardation at wavelengths of 450 nm and 550 nm satisfies the following formulae (1) and/or (2), and the water absorption is no greater than 1%.

$$R(450)/R(550)<1 \quad (1)$$

$$K(450)/K(550)<1 \quad (2)$$

where R(450) and R(550) represent the in-plane retardation of the oriented polymer film at wavelengths of 450 nm and 550 nm, respectively, and K(450) and K(550) are the values calculated by $K=[n_z-(n_x+n_y)/2]\times d$ (where $n_x$, $n_y$ and $n_z$ represent the three-dimensional refractive indexes of the oriented polymer film as the refractive indexes in the direction of the x-axis, y-axis and z-axis, respectively, and d represents the thickness of the film) for the oriented polymer film at a wavelength of 450 nm and 550 nm, respectively. There are provided laminated retardation films and liquid crystal display devices employing the retardation film.

26 Claims, 8 Drawing Sheets

OTHER PUBLICATIONS

Letter to Dr. Uchiyama from Asia Display/IDW '01 inviting Dr. Uchiyama to speak at the 21$^{st}$ International Display Research Conference in conjunction with The 8$^{th}$ International Display Workshops in Oct. 16–19, 2001, Jun. 26, 2001.

A. Uchiyama, T. Yatabe, "P–5: Characteristics and Applications of New Wide–Band Retardation Films", SID 01 Digest, Jun. 2001.

Partial translation of JP 7–287118, Oct. 31, 1995.

Partial translation of JP 6–82624, Mar. 25, 1994.

Partial translation of JP 8–57950, Mar. 5, 1996.

RETARDATION FILM AND OPTICAL DEVICE EMPLOYING IT

TECHNICAL FIELD

The present invention relates to a retardation film having a smaller retardation value at a shorter wavelength at a measuring wavelength of 400–700 nm, that is used in optical elements of liquid crystal display devices, anti-glare films, optical recording devices and the like, and to circular polarizing plates, elliptical polarizing plates, liquid crystal display devices and other optical devices.

BACKGROUND ART

Retardation films are used in STN (Super Twisted Nematic) systems of liquid crystal display devices and the like, and they are employed to solve such problems as color compensation and to achieve viewing angle widening. The materials generally used in retardation films for color compensation are polycarbonates, polyvinyl alcohol, polysulfone, polyethersulfone, amorphous polyolefins and the like, while the materials used in retardation films for viewing angle widening are those mentioned above, as well as polymer liquid crystals, discotic liquid crystals, and the like.

A quarter-wave plate, which is one type of retardation film, can convert circularly polarized light to linearly polarized light, or linearly polarized light to circularly polarized light. This has been utilized in liquid crystal display devices and, particularly, in reflective liquid crystal display devices having a single polarizing plate where the rear electrode, as viewed by an observer, is the reflecting electrode, in antireflection films comprising a combination of a polarizing plate and a quarter-wave plate, or in combination with reflective polarizing plates composed of cholesteric liquid crystals or the like that reflect only circularly polarized light only in either the clockwise direction or counter-clockwise direction.

The retardation films used in the aforementioned single polarizing plate-type reflective liquid crystal display devices and reflective polarizing plates must have a function of converting linearly polarized light to circularly polarized light and circularly polarized light to linearly polarized light, in the visible light region with a measuring wavelength of 400–700 nm, and preferably 400–780 nm. When this is accomplished with a single retardation film, the retardation film ideally has a retardation of $\lambda/4$ (nm) at a measuring wavelength $\lambda$ of 400–700 nm, and preferably 400–780 nm.

Although the aforementioned color compensating retardation film materials are commonly used as quarter-wave plates, these materials exhibit birefringent wavelength dispersion. The birefringence of most polymer films becomes larger as the measuring wavelength becomes shorter, and becomes smaller at longer wavelengths. Consequently, with a single polymer film it has been difficult to achieve a smaller birefringence at shorter measuring wavelengths at a measuring wavelength $\lambda$ of 400–700 nm, such as with the aforementioned ideal quarter-wave plate.

In order to achieve a smaller birefringence with shorter measuring wavelengths as with an ideal quarter-wave plate, Japanese Unexamined Patent Publication HEI No. 10-68816 has disclosed a technique of using a quarter-wave plate and a half-wave plate attached together at an appropriate angle, and Japanese Unexamined Patent Publication HEI No. 2-285304 has disclosed a technique whereby two retardation films with different Abbe numbers are laminated.

Current techniques require the use of two films in order to achieve a film with a smaller retardation with shorter measuring wavelengths as with ideal quarter-wave plates, and this has presented problems such as additional steps for film attachment and increased costs as well as greater expense for the optical design. In Japanese Unexamined Patent Publication HEI No. 3-29921 there is disclosed a retardation film obtained by uniaxially stretching a film composed of a mixture or copolymer of at least two different organic polymers, wherein the first organic polymer of the two different organic polymers has a positive photoelastic constant and the second organic polymer has a negative photoelastic constant, so that the retardation film has a larger birefringence at shorter measuring wavelengths; however, no reference is made to a method of reducing the birefringence at shorter measuring wavelengths. The present invention solves this problem by allowing realization of a retardation film with a smaller retardation, at shorter measuring wavelengths, using a single film.

SUMMARY OF THE INVENTION

The present inventors have diligently researched polymer materials for retardation films with the aim of solving the aforementioned problem, and have succeeded in providing a retardation film comprised of a single oriented polymer film, characterized in that the retardation at wavelengths of 450 nm and 550 nm satisfies the following formulae (1) and/or (2):

$$R(450)/R(550)<1 \quad (1)$$

$$K(450)/K(550)<1 \quad (2)$$

where R(450) and R(550) represent the in-plane retardation of the oriented polymer film at wavelengths of 450 nm and 550 nm, respectively, and K(450) and K(550) are the values calculated by $K=[n_z-(n_x+n_y)/2]\times d$ (where $n_x$, $n_y$ and $n_z$ represent the three-dimensional refractive indexes of the oriented polymer film as the refractive indexes in the direction of the x-axis, y-axis and z-axis, respectively, and d represents the thickness of the film) for the oriented polymer film at a wavelength of 450 nm and 550 nm, respectively, and the water absorption is no greater than 1%.

[1] A retardation film comprising a single oriented polymer film, the retardation film being characterized in that the retardation at wavelengths of 450 nm and 550 nm satisfies the following formulae (1) and/or (2), and the water absorption is no greater than 1%.

$$R(450)/R(550)<1 \quad (1)$$

$$K(450)/K(550)<1 \quad (2)$$

(where R(450) and R(550) represent the in-plane retardation of the oriented polymer film at wavelengths of 450 nm and 550 nm, respectively, and K(450) and K(550) are the values calculated by $K=[n_z-(n_x+n_y)/2]\times d$ (where $n_x$, $n_y$ and n represent the three-dimensional refractive indexes of the oriented polymer film as the refractive indexes in the direction of the x-axis, y-axis and z-axis, respectively, and d represents the thickness of the film) for the oriented polymer film at a wavelength of 450 nm and 550 nm, respectively.]

[2] A retardation film according to [1], wherein the retardation at wavelengths of 450 nm, 550 nm and 650 nm satisfies the following formulae (3) and (4):

$$0.6<R(450)/R(550)<0.97 \quad (3)$$

$$1.01<R(650)/R(550)<1.4 \quad (4)$$

where R(650) represents the in-plane retardation of the oriented polymer film at a wavelength of 650 nm.

[3] A retardation film according to [1] or [2], wherein the retardation is smaller with a shorter wavelength in the wavelength range of 400–700 nm.

[4] A retardation film according to [1] to [3], which comprises an oriented polymer film wherein (1) the film is composed of a polymer comprising a monomer unit of a polymer with positive refractive index anisotropy (hereunder referred to as "first monomer unit") and a monomer unit of a polymer with negative refractive index anisotropy (hereunder referred to as "second monomer unit"), (2) R(450)/R(550) for the polymer based on the first monomer unit is smaller than R(450)/R(550) for the polymer based on the second monomer unit, and (3) the film has positive refractive index anisotropy.

[5] A retardation film according to [1] to [3], which comprises an oriented polymer film wherein (1) the film is composed of a polymer comprising a monomer unit that forms a polymer with positive refractive index anisotropy (hereunder referred to as "first monomer unit") and a monomer unit that forms a polymer with negative refractive index anisotropy (hereunder referred to as "second monomer unit"), (2) R(450)/R(550) for the polymer based on the first monomer unit is larger than R(450)/R(550) for the polymer based on the second monomer unit, and (3) the film has negative refractive index anisotropy.

[6] A retardation film according to [1] to [5], wherein the oriented polymer film is a thermoplastic resin with a glass transition temperature of 120° C. or higher.

[7] A retardation film according to [1] to [6], wherein the oriented polymer film contains a polycarbonate with a fluorene skeleton.

[8] A retardation film according to [1] to [7], which is an oriented polymer film comprising copolymer and/or blend of polycarbonates in which 30–90 mole percent of the total consists of a repeating unit represented by the following general formula (I):

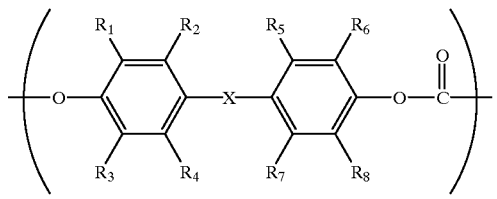

(I)

where $R_1$–$R_8$ are each independently selected from among hydrogen, halogen atoms and hydrocarbon groups of 1–6 carbon atoms, and X is

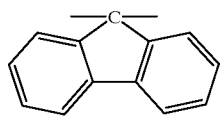

and 70–10 mole percent of the total consists of a repeating unit represented by the following general formula (II):

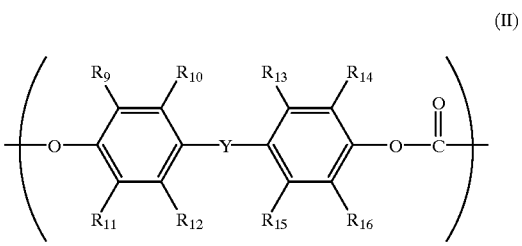

(II)

where $R_9$–$R_{16}$ are each independently selected from among hydrogen, halogen atoms and hydrocarbon groups of 1–22 carbon atoms, and Y is

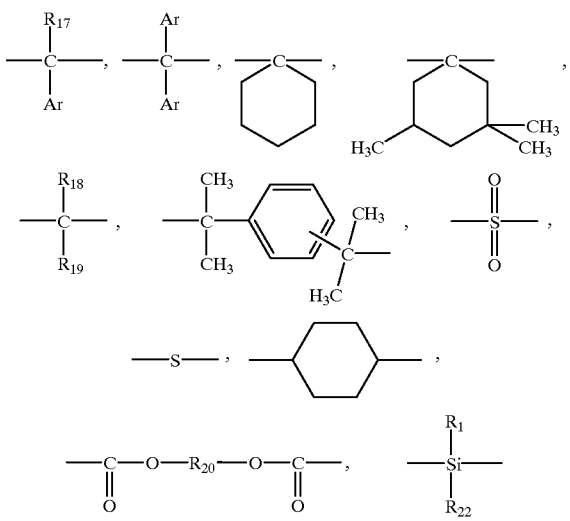

or —$R_{23}$—, wherein Y, $R_{17}$–$R_{19}$, $R_{21}$ and $R_{22}$ are each independently selected from among hydrogen, halogen atoms and hydrocarbon groups of 1–22 carbon atoms, $R_{20}$ and $R_{23}$ are selected from among hydrocarbon groups of 1–20 carbon atoms, and Ar is selected from among aryl groups of 6–10 carbon atoms.

[9] A retardation film according to [8], which is an oriented polymer film comprising copolymer and/or blend of polycarbonates in which 35–85 mole percent of the total consists of a repeating unit represented by the following general formula (III):

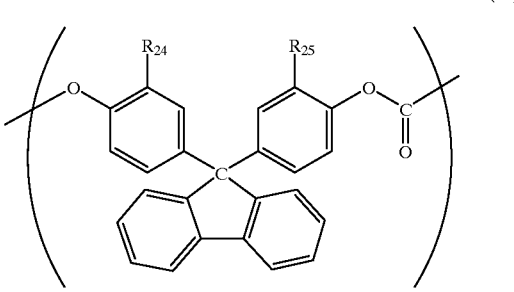

(III)

where $R_{24}$ and $R_{25}$ are each independently selected from among hydrogen and methyl, and 65–15 mole percent of the total consists of a repeating unit represented by the following general formula (IV):

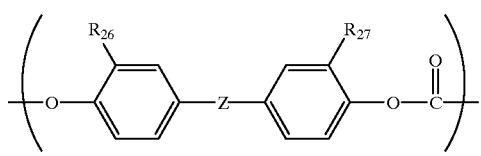

(IV)

where $R_{26}$ and $R_{27}$, are each independently selected from among hydrogen and methyl,
and Z is selected from among

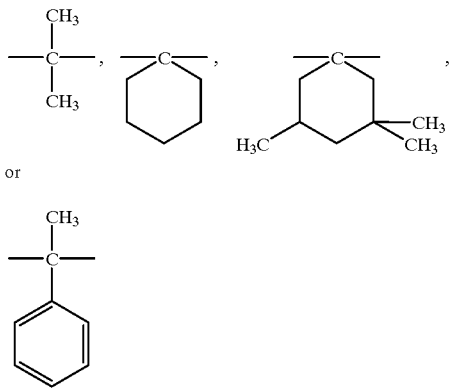

or

[10] A retardation film according to [5], which is a blended oriented polymer film in which the polymer with positive refractive index anisotropy is poly(2,6-dimethyl-1,4-phenyleneoxide) and the polymer with negative refractive index anisotropy is polystyrene, wherein the polystyrene content is from 67 wt % to 75 wt %.

[11] A retardation film according to [1] to [10], wherein the b* value representing the object color is 1.3 or smaller.

[12] A retardation film according to [1] to [11], which is a λ/4 plate.

[13] A retardation film according to [1] to [11], which is a λ/2 plate.

[14] A retardation film according to [12] or [13], wherein R(550)≧90 nm.

[15] A laminated retardation film prepared by laminating a λ/4 plate and a λ/2 plate, wherein both the λ/4 plate and λ/2 plate are a retardation film according to [1] to [14].

[16] A laminated retardation film according to [15], wherein the angle formed between the optical axes of the λ/4 plate and λ/2 plate is in the range of 50°–70°.

[17] A circular polarizing plate or elliptical polarizing plate prepared by laminating a polarizing plate with a retardation film according to [1] to [16].

[18] A circular polarizing plate or elliptical polarizing plate prepared by laminating a reflective polarizing plate with a retardation film according to [1] to [16].

[19] A circular polarizing plate or elliptical polarizing plate prepared by laminating a polarizing plate with a retardation film according to [1] to [16] and a reflective polarizing plate.

[20] A circular polarizing plate or elliptical polarizing plate according to [18] or [19], wherein the reflective polarizing plate has a function of reflecting only circularly polarized light rotated in one direction.

[21] A circular polarizing plate or elliptical polarizing plate according to [20], wherein the reflective polarizing plate is composed of a cholesteric liquid crystal polymer.

[22] A liquid crystal display device provided with a retardation film according to [1] to [21].

[23] A liquid crystal display device according to [22], which is a reflective liquid crystal display device.

[24] A liquid crystal display device according to [22] or [23], wherein the retardation film is a viewing angle compensating plate.

[25] A retardation film which is a retardation film comprised of a single polycarbonate oriented film, wherein the retardation at wavelengths of 450 nm and 550 nm satisfies the following formula (1):

$$R(450)/R(550)<1 \qquad (1)$$

where R(450) and R(550) represent the in-plane retardation of the oriented polymer film at wavelengths of 450 nm and 550 nm, respectively, and R(550) is at least 50 nm.

[26] A reflective liquid crystal display device provided with a polarizing plate, a λ/4 plate and a liquid crystal cell containing a liquid crystal layer between two substrates with transparent electrodes in that order, the reflective liquid crystal display device employing as the λ/4 plate a retardation film comprising a single oriented polycarbonate film, wherein the retardation at wavelengths of 450 nm and 550 nm satisfies the following formula (1):

$$R(450)/R(550)<1 \qquad (1)$$

where R(450) and R(550) represent the in-plane retardation of the oriented polymer film at wavelengths of 450 nm and 550 nm, respectively, and R(550) is 100–180 nm.

BRIEF DESCRIPTION OF THE DRAWINGS

FIG. 7 is a combination of a λ/4 plate 3 and a λ/2 plate 1, FIG. 8 is a combination of a λ/4 plate, a λ/2 plate and a polarizing plate 4, FIG. 9 is a combination of a λ/4 plate and a polarizing plate, and FIG. 10 is a combination of a polarizing plate 4, a λ/4 plate 3 and a cholesteric liquid crystal layer 5. FIG. 10 corresponds to Example 17.

FIG. 12 has the construction: polarizing plate 4//λ/4 plate 3//glass plate 6//transparent electrode 7//liquid crystal layer 8//concavoconvex reflective electrode 9//glass plate 6; and FIG. 13 has the construction: polarizing plate 4//λ/4 plate 3//light diffusing plate 11//glass substrate 6//transparent electrode 7//liquid crystal layer 8//specular reflective electrode 12//glass electrode 6. FIG. 12 corresponds to Example 13.

DETAILED DESCRIPTION OF THE INVENTION

Figure 1:
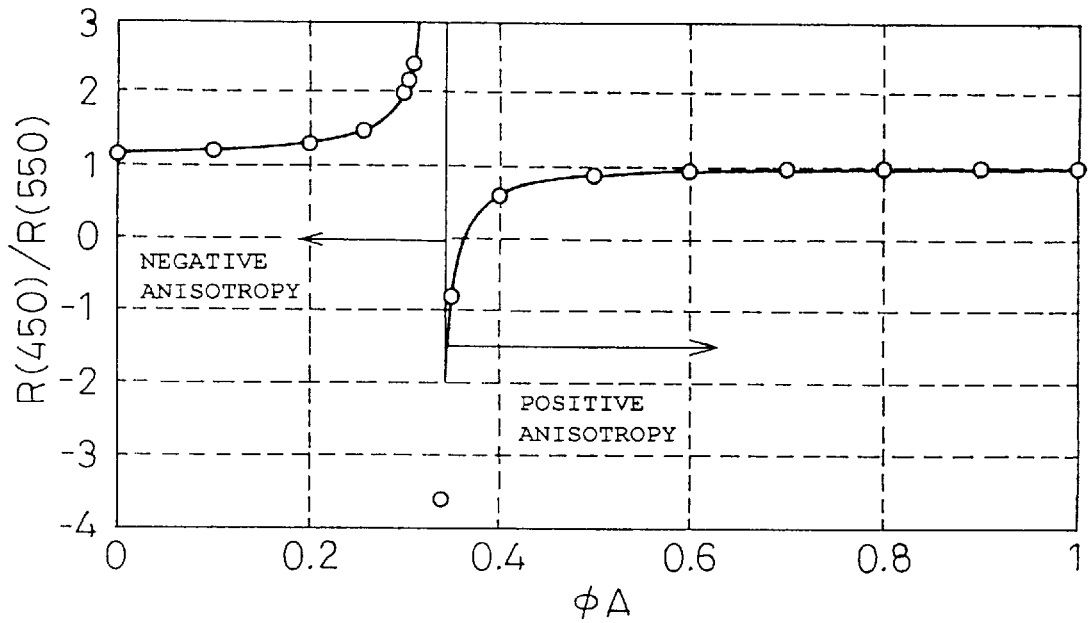
FIGS. 1 to 4 are graphs showing the relationship between the wavelength dispersion of birefringence of a two-component blended polymer and the type and blend ratio of the polymer.

The present invention, as a result of efforts to obtain an ideal λ/4 plate and λ/2 plate for a single oriented polymer film that is independent of wavelength in the visible light wavelength region, successfully provides a single oriented polymer film with a retardation that is smaller at shorter wavelengths, thereby achieving the object described above while also providing a retardation film with properties not exhibited by the prior art.

The aspect of a retardation that is smaller with shorter wavelengths may be represented from a practical standpoint by the formula R(450)/R(550)<1 or K(450)/K(550)<1. For an extended wavelength range, R(650)/R(550)>1 or K(650)/K(550)>1 is preferred. More preferred ranges for the retardation dispersion and K value dispersion will be explained below.

According to the invention, the retardation and K value of an oriented polymer film at wavelengths of 450, 550 and 650 nm will be represented as R(450), R(550), R(650) and K(450), K(550), K(650), respectively.

The retardation of an oriented polymer film is the difference in phase when light passes through a film of thickness d, based on the difference in the speeds of advance of light (refractive index) in the direction of orientation of the film and the direction normal thereto; it is known to be represented by Δn·d as the product of the difference in refractive indexes in the orientation direction and the direction normal thereto Δn and the film thickness d.

The orientation of an oriented polymer film according to the invention indicates a state in which the polymer molecule chains are aligned in primarily a given direction, and this state can be measured by measuring the retardation of the film (Δn·d); however, the orientation referred to here is one in which the retardation R(550) is at least 20 nm and/or K(550) is at least 20 nm, at a measuring wavelength of 550 nm. The orientation is normally produced by stretching the film.

Since the retardation Δn·d is proportional to the birefringence Δn for the same oriented polymer film, the wavelength dispersion (wavelength dependency) of the retardation can be represented by the wavelength dispersion (wavelength dependency) of the birefringence Δn.

When the refractive index in the orientation direction in the plane of the oriented polymer film is larger than the refractive index in the direction normal thereto, the optical anisotropy is said to be positive, whereas in the opposite case the optical anisotropy is said to be negative. Here, the orientation direction of the oriented polymer film is the direction of drawing, when the film has been uniaxially drawn, for example, under conditions near the glass transition temperature Tg (Tg ±20° C.), which are publicly known retardation film manufacturing conditions. In the case of biaxial drawing, it is the direction of drawing in which the orientation is higher.

According to the invention, reference to the retardation will mean the absolute value of the retardation. In the case of negative optical anisotropy the retardation is negative, but for the purposes of the invention the positive or negative sign will be ignored unless otherwise specified.

Also, the measuring optical wavelength used to judge the positive or negative optical anisotropy will be 550 nm.

According to the invention, it has been discovered that a retardation film comprised of a single oriented polymer film having a smaller retardation at shorter wavelengths can be obtained by an oriented polymer film satisfying the following conditions (A) or (B).

(A) An oriented polymer film wherein
(1) the film is composed of a polymer comprising a monomer unit of a polymer with positive refractive index anisotropy (hereunder referred to as "first monomer unit") and a monomer unit of a polymer with negative refractive index anisotropy (hereunder referred to as "second monomer unit"),
(2) R(450)/R(550) for the polymer based on the first monomer unit is smaller than R(450)/R(550) for the polymer based on the second monomer unit, and
(3) the film has positive refractive index anisotropy.

(B) An oriented polymer film wherein
(1) the film is composed of a polymer comprising a monomer unit that forms a polymer with positive refractive index anisotropy (hereunder referred to as "first monomer unit") and a monomer unit that forms a polymer with negative refractive index anisotropy (hereunder referred to as "second monomer unit"),
(2) R(450)/R(550) for the polymer based on the first monomer unit is larger than R(450)/R(550) for the polymer based on the second monomer unit, and
(3) the film has negative refractive index anisotropy.

Films satisfying the following conditions (C) and (D) are examples of modes that satisfy the aforementioned conditions (A) and (B).

(C) An oriented polymer film wherein
(1) the film is composed of a blend polymer comprising a polymer with positive refractive index anisotropy and a polymer with negative refractive index anisotropy and/or a copolymer comprising a monomer unit of a polymer with positive refractive index anisotropy and a monomer unit of a polymer with negative refractive index anisotropy,
(2) R(450)/R(550) for the polymer with the positive refractive index anisotropy is smaller than R(450)/R(550) for the polymer with the negative refractive index anisotropy, and
(3) the film has positive refractive index anisotropy.

(D) An oriented polymer film wherein
(1) the film is composed of a blend polymer comprising a polymer with positive refractive index anisotropy and a polymer with negative refractive index anisotropy and/or a copolymer comprising a monomer unit of a polymer with positive refractive index anisotropy and a monomer unit of a polymer with negative refractive index anisotropy,
(2) R(450)/R(550) for the polymer with the positive refractive index anisotropy is larger than R(450)/R(550) for the polymer with the negative refractive index anisotropy, and
(3) the film has negative refractive index anisotropy.

Here, a polymer with positive or negative refractive index anisotropy is a polymer that gives an oriented polymer film with positive or negative refractive index anisotropy.

The following explanation concerns the reasons for which the above retardation film is a necessary condition to have a smaller retardation with shorter measuring wavelengths.

It is generally known that the birefringence Δn of a polymer blend comprising two components, polymer A and polymer B may be represented in the following manner (H. Saito and T. Inoue, J. Pol. Sci. Part B, 25, 1629 (1987))

$$\Delta n = \Delta n^0_A f_A \phi_A + \Delta n^0_B f_B \phi_B + \Delta n_F \tag{a}$$

Here, $\Delta n^0_A$ is the intrinsic birefringence of polymer A, $\Delta n^0_B$ is the intrinsic birefringence of polymer B, $f_A$ is the orientation function of polymer A, $f_B$ is the orientation function of polymer B, $\phi_A$ is the volume fraction of polymer A, $\phi_B$ is the volume fraction of polymer B $(=1-\phi_A)$, and $\Delta n_F$ is the structural birefringence. The birefringence $\Delta n$ is generally represented by $\Delta n = f \Delta n^o$. Also, $\Delta n^o$ may be determined by combining dichromatic infrared spectroscopy with retardation measurement and the others.

Formula (a) completely ignores changes in the polarizability due to electron interaction between polymers A and B, and this assumption is also used hereunder. Also, since optical transparency is a requirement for uses of retardation films such as for the present invention, the blend is preferably a compatible blend, in which case $\Delta n_F$ is sufficiently small that it may be ignored.

As concerns a retardation film with a smaller birefringence at shorter measuring wavelengths, the only measuring wavelengths considered here are 450 and 550 nm. Designating the birefringence of the retardation film at these wavelengths as $\Delta n(450)$ and $\Delta n(550)$, respectively, this is represented as $\Delta n(450)/\Delta n(550)<1$. For a retardation film comprising a conventional polymer film, this is of course $\Delta n(450)/\Delta n(550)>1$, and for example, $\Delta n(450)/\Delta n(550)$ is about 1.08 for a polycarbonate obtained by polymerization of bisphenol A and phosgene; it is about 1.01 even for polyvinyl alcohol which is said to have a low wavelength dispersion of birefringence.

If $\Delta n(450)/\Delta n(550)$ is defined as the birefringence wavelength dispersion coefficient, it may be represented as follows from formula (a).

$$\Delta n(450)/\Delta n(550) = (\Delta n^o_A(450)f_A\phi_A + \Delta n^o_B(450)f_B\phi_B) / (\Delta n^o_A(550)f_A\phi_A + \Delta n^o_B(550)f_B\phi_B) \quad (b)$$

Here, $f_A = f_B$ is assumed because of a compatible blend, and therefore formula (b) below may be derived.

$$\Delta n(450)/\Delta n(550) = (\Delta n^o_A(450)\phi_A + \Delta n^o_B(450)\phi_B) / (\Delta n^o_A(550)\phi_A + \Delta n^o_B(550)\phi_B) \quad (c)$$

The theoretical values listed in Table 1 were then used in formula (c) to determine the birefringence wavelength dispersion values. In Table 1, the birefringence dispersion values for polymers A and B alone were listed in place of $\Delta n^o_A(450)$ and $\Delta n^o_B(450)$.

TABLE 1

| Case | $\Delta n^o_A$ (550) | $\Delta n^o_B$ (550) | $\Delta n^o_A$ (450)/ $\Delta n^o_A$ (550) | $\Delta n^o_B$ (450)/ $\Delta n^o_B$ (550) |
|---|---|---|---|---|
| 1 | 0.2 | −0.1 | 1.01 | 1.15 |
| 2 | 0.2 | −0.1 | 1.15 | 1.01 |
| 3 | 0.1 | −0.2 | 1.01 | 1.15 |
| 4 | 0.1 | −0.2 | 1.15 | 1.01 |

When the values in Table 1 are inserted into formula (c), the graphs of FIGS. 1–4 are obtained on the function of $\phi A$. Since polymer A is the polymer with positive refractive index anisotropy and polymer B is the negative one in Table 1, the optical anisotropy of the blend polymer is negative in the region with lower $\phi A$ than the asymptotote in FIGS. 1–4, while the anisotropy is positive in the region with higher $\phi A$ than the asymptotic curve.

As clearly seen in FIGS. 1–4, in order to satisfy $\Delta n(450)/\Delta n(550)<1$, it is necessary for the birefringence wavelength dispersion coefficient of the positive polymer to be smaller than that of the negative one and the optical anisotropy of the oriented polymer film to be positive, as in cases 1 and 3 of Table 1, or for the birefringence wavelength dispersion coefficient of the polymer alone to be larger than that of the negative one and the optical anisotropy of the oriented polymer film to be negative, as in cases 2 and 4. Here, 450 and 550 nm were used as the representative wavelengths, but the same applies even when other wavelengths are used.

In consideration of formula (c), when the positive and negative polymer birefringence wavelength dispersion coefficients are exactly equal, a retardation film according to the invention cannot be obtained.

This consideration is based on formula (a), but since this idea is very well supported in actual systems such as in the examples described hereunder, the examples also substantiate the correctness of this idea.

While this consideration was explained for two components, the same idea applies even for three or more components. For example, in a system with two components having positive optical anisotropy and one component having negative anisotropy, the birefringence value and birefringence dispersion value of the component with positive optical anisotropy is compensated for by the volume fraction and the others between the two components with positive anisotropy, and the two components may be considered as one component when applying the idea described in the portion of the above formula (a) onward.

The explanation based on formula (a) concerned a blend of polymers A and B, but the same idea may be applied even to copolymers containing monomer units of different polymers, and the above-mentioned idea may be applied by considering it to comprise a homopolymer based on a first monomer unit (polymer A) and a homopolymer based on a second monomer unit different from the first monomer unit (polymer B).

The same idea may also be applied even to polymer blends of homopolymers and copolymers or polymer blends of two copolymers. That is, in such cases the idea may be applied by dividing the component polymers of the polymer blend into their constituent monomer units, considering the polymer blend as an aggregate of homopolymers made of respective monomer units, and considering this aggregate as a combination of polymer A comprising a group of homopolymers with positive optical anisotropy and polymer B comprising a group of homopolymers with negative anisotropy.

For example, for a blend of polymers X and Y having positive optical anisotropy and a copolymer of monomer units x, z having negative optical anisotropy, if x has positive optical anisotropy and z has negative optical anisotropy, the fact that the components having positive optical anisotropy are X, Y and x may be considered and their birefringence values and birefringence dispersion values compensated for by the volume fractions and the others between the three positive anisotropy components, where the three components are considered as one component A, while the component with negative anisotropy is considered as polymer B comprising monomer unit z, and the idea describe in the portion of the formula (a) onward may be applied for component A and component B.

For a homopolymer based on the first or second monomer unit, when the homopolymer is a polycarbonate, since polycarbonates are usually obtained by polycondensation of a dihydroxy compound and phosgene, from the standpoint of polymerization the monomers are the bisphenol dihydroxy compound and phosgene. In the case of such a polycarbonate, the monomer unit is said to be the portion derived from the bisphenol, and does not include the portion derived from the phosgene.

The birefringence $\Delta n$ is preferably larger with longer wavelengths in the measuring wavelength region, and more specifically, it preferably satisfies the following formulae (d) and (e).

$$0.60 < R(450)/R(550) < 0.97 \quad (d)$$

and $$1.01 < R(650)/R(550) < 1.35 \quad (e)$$

Outside of these ranges, if the film is used as a λ/4 plate, for example, a problem occurs in that linearly polarized light at 400–700 nm incident to the film takes a polarized state that is completely circularly polarized at certain wavelengths, while notably shifting from circular polarization at other wavelengths. More preferred, therefore, are the ranges:

$$0.60 < R(450)/R(550) < 0.95 \quad (d')$$

and $$1.05 < R(650)/R(550) < 1.35 \quad (e')$$

The above is a development of the theory based on the retardation An or birefringence An, but the same theory can be developed based on the K value of the three-dimensional refractive indexes $(K=[n_z-(n_x+n_y)/2]\times d)$. When this K value is such that K(450)/K(550)<1, the wavelength dispersion is smaller with shorter wavelengths, similar to the retardation (birefringence) for light from an inclined direction that is not normal to the surface of the oriented polymer film.

The preferred ranges for the K value are those obtained by substituting K for R in the above formulae (d) and (e).

The retardation film of the invention may consist of a blend polymer or a copolymer, such as explained above.

The polymer material composing the retardation film of the invention is not particularly limited and may be any blend or copolymer that satisfies the aforementioned conditions, although preferred are materials with excellent heat resistance, satisfactory optical performance and suitability to solution film formation, with thermoplastic polymers being especially preferred. For example, one or more types may be appropriately selected from among polyacrylates, polyesters, polycarbonates, polyolefins, polyethers, polysulfin-based copolymers, polysulfone, polyethersulfone and the like. However, since problems may arise in the practicality of the retardation film if the water absorption of the oriented polymer film is greater than 1 wt %, it is important to select a film material satisfying the condition of a film water absorption of no greater than 1 wt %, and preferably no greater than 0.5 wt %.

A blend polymer must be optically transparent, and therefore it is preferably a compatible blend or one that has roughly equal refractive indexes for each polymer. As suitable examples of specific combinations of blend polymers there may be mentioned combinations of poly(methyl methacrylate) with polymers having positive optical anisotropy such as poly(vinylidene fluoride), poly(ethylene oxide) and poly(vinylidene fluoride-co-trifluoroethylene), combinations of polymers having positive optical anisotropy such as poly(phenylene oxide) with polymers having negative optical anisotropy such as polystyrene, poly(styrene-co-lauroyl maleimide), poly(styrene-co-cyclohexyl maleimide) and poly(styrene-co-phenyl maleimide), a combination of poly(styrene-co-maleic anhydride) having negative optical anisotropy with polycarbonate having positive optical anisotropy, and a combination of poly(acrylonitrile-co-butadiene) having positive optical anisotropy with poly (acrylonitrile-co-styrene) having negative optical anisotropy; however, there is no limitation to these. From the standpoint of transparency, a combination of polystyrene with poly(phenylene oxide) such as poly(2,6-dimethyl-1,4-phenylene oxide) is particularly preferred. For such combinations, the proportion of the polystyrene preferably constitutes from 67 wt % to 75 wt % of the whole.

Examples of copolymers that may be used include poly (butadiene-co-polystyrene), poly(ethylene-co-polystyrene), poly(acrylonitrile-co-butadiene), poly(acrylonitrile-co-butadiene-co-styrene), polycarbonate copolymers, polyester copolymers, polyester carbonate copolymers and polyallylate copolymers. Polycarbonate copolymers, polyester copolymers, polyester carbonate copolymers, polyallylate copolymers and the like that have fluorene skeletons are particularly preferred because the fluorene skeleton segments can provide negative optical anisotropy.

Particularly preferred for use are polycarbonate copolymers produced by reaction of a bisphenol with phosgene or a compound that forms a carbonic acid ester such as diphenyl carbonate, because of their excellent transparency, heat resistance and productivity.

Preferred polycarbonate copolymers are copolymers containing structures with fluorene skeletons. The component with the fluorene structure is preferably included at 1–99 mole percent.

Suitable materials for the oriented polymer film of the retardation film of the invention are materials that give an oriented polymer film of a polycarbonate composed of a repeating unit represented by the following general formula (I):

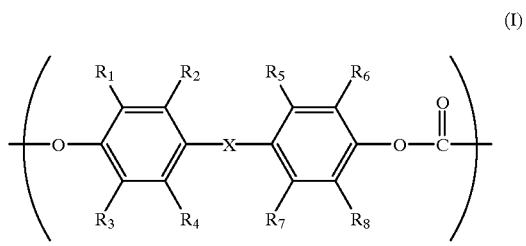

where $R_1$–$R_8$ are each independently selected from among hydrogen, halogen atoms and hydrocarbon groups of 1–6 carbon atoms, and X is

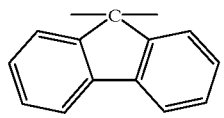

and a repeating unit represented by the following general formula (II):

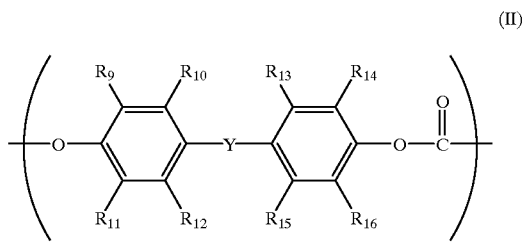

where $R_9$–$R_{16}$ are each independently selected from among hydrogen, halogen atoms and hydrocarbon groups of 1–22 carbon atoms, and Y is selected from among referred to as "blend polymer"). In the case of a copolymer, two or more of each of the repeating units represented by formulas (I) and (II) may be combined, and in the case of a composition as well, two or more of the aforementioned repeating units may be used in combination.

In formula (I), $R_1$–$R_8$ are each independently selected from among hydrogen, halogen atoms and hydrocarbon groups of 1–6 carbon atoms. As hydrocarbon groups of 1–6 carbon atoms there may be mentioned alkyl groups such as methyl, ethyl, isopropyl and cyclohexyl, and aryl groups such as phenyl. Of these, hydrogen and methyl are preferred.

In formula (II), $R_9$–$R_{16}$ are each independently selected from among hydrogen, halogen atoms and hydrocarbon groups of 1–22 carbon atoms. As hydrocarbon groups of 1–22 carbon atoms there may be mentioned alkyl groups of 1–9 carbon atoms such as methyl, ethyl, isopropyl and cyclohexyl, and aryl groups such as phenyl, biphenyl and terphenyl. Of these, hydrogen and methyl are preferred.

In Y of formula (II), $R_{17}$–$R_{19}$, $R_{21}$ and $R_{22}$ are each independently selected from among hydrogen, halogen atoms and hydrocarbon groups of 1–22 carbon atoms, which hydrocarbon groups may be the same as those mentioned above. $R_{20}$ and $R_{23}$ are selected from among hydrocarbon groups of 1–20 carbon atoms, which hydrocarbon groups may also be the same as those mentioned above. Ar is selected from among aryl groups of 6–10 carbon atoms such as phenyl and naphthyl.

The content of formula (I), i.e. the copolymer composition in the case of a copolymer or the blend composition ratio in the case of a composition, is 30–90 mole percent of the total polycarbonate. Outside of this range, the absolute value of the retardation will not be smaller with shorter wavelengths at measuring wavelengths of 400–700 nm. The content of formula (I) is preferably

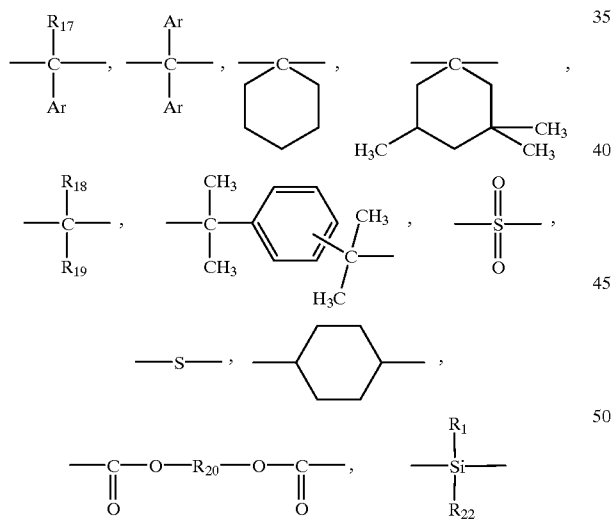

and —$R_{23}$—,
where in Y, $R_{17}$–$R_{19}$, $R_{21}$ and $R_{22}$ are each independently selected from among hydrogen, halogen atoms and hydrocarbon groups of 1–22 carbon atoms, $R_{20}$ and $R_{23}$ are each independently selected from among hydrocarbon groups of 1–20 carbon atoms, and Ar is selected from among aryl groups of 6–10 carbon atoms, such that the repeating unit represented by formula (I) constitutes 30–90 mole percent of the total polycarbonate and the repeating unit represented by formula (II) constitutes 70–10 mole percent of the whole.

This material is a polycarbonate copolymer comprising a repeating unit with a fluorene skeleton represented by formula (I) above and a repeating unit represented by formula (II) above, or a composition containing a polycarbonate comprising a repeating unit with a fluorene skeleton represented by formula (I) above and a polycarbonate comprising a repeating unit represented by formula (II) above (hereunder also 35–85 mole percent, and more preferably 40–80 mole percent, of the total polycarbonate.

Here, the above molar ratio can be determined by, for example, nuclear magnetic resonance (NMR) with the total bulk of the polycarbonate composing the oriented polymer film, regardless of the copolymer or blend polymer.

The polycarbonate in the material is preferably a polycarbonate copolymer and/or polycarbonate composition (blend polymer) comprising a repeating unit represented by the following general formula (III):

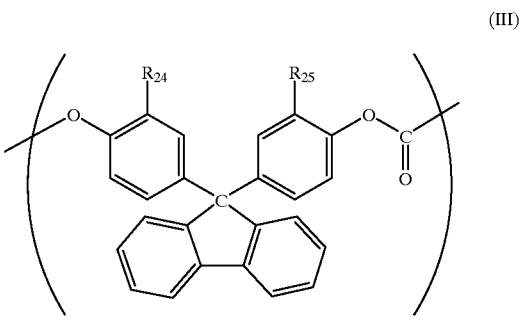

where $R_{24}$ and $R_{25}$ are each independently selected from among hydrogen and methyl,
and a repeating unit represented by the following general formula (IV):

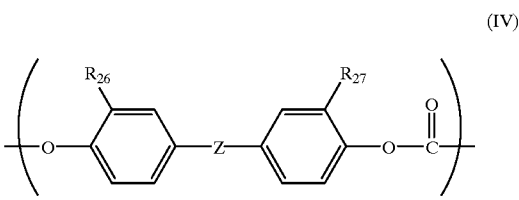

where $R_{26}$ and $R_{27}$ are each independently selected from among hydrogen and methyl, and Z is selected from among

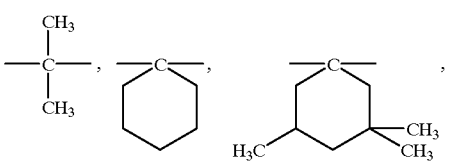

and

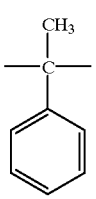

For copolymers comprising the repeating units represented by the following formulae (V) to (IX), those with repeating unit (IX) in a proportion of 40–75 mole percent are preferred; for copolymers comprising repeating units represented by the following formulae (VI) and (IX), those with (IX) in a proportion of 30–70 mole percent are preferred; for copolymers comprising repeating units represented by the following formulae (VII) and (IX), those with (IX) in a proportion of 30–70 mole percent are preferred; and for copolymers comprising repeating units represented by the following formulae (V) and (VIII), those with (VIII) in a proportion of 40–75 mole percent are preferred.

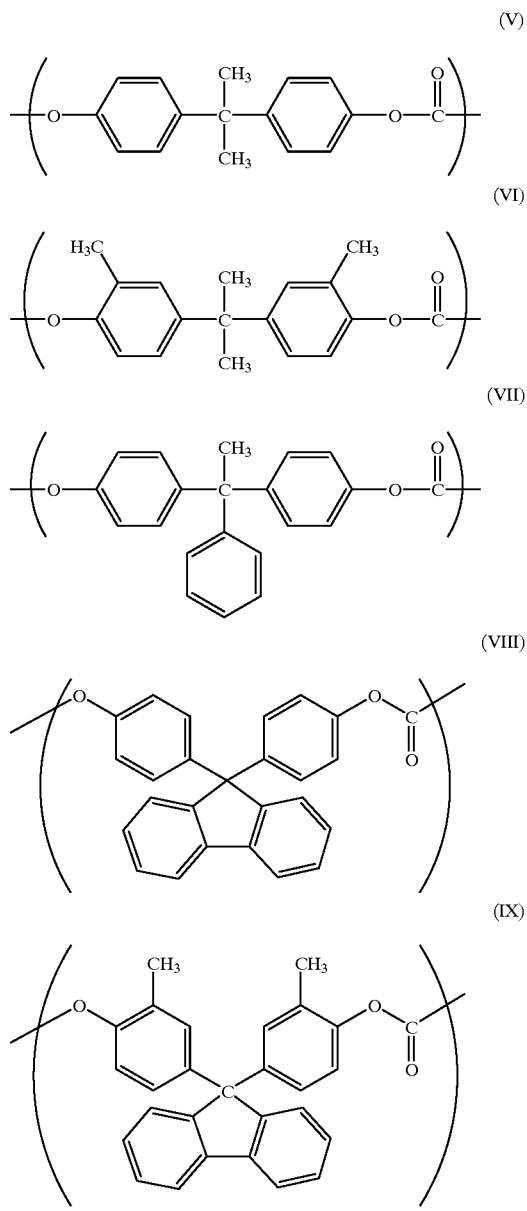

The most preferred materials are copolymers or polymer blends containing bisphenol A (BPA, corresponding to formula (V)) and biscresolfluorein (BCF, corresponding to formula (IX)), or their mixtures, and the ratio of their components is such for a BCF content of 55–75 mole percent, and preferably 55–70 mole percent. Such materials can give λ/4 plates or λ/2 plates closest to the ideal.

The aforementioned copolymers and/or blend polymers can be produced by publicly known processes. For polycarbonates, polycondensation processes and molten polycondensation processes with dihydroxy compounds and phosgene may be suitably used. For blends, compatible blends are preferred but even if they are not totally compatible the refractive indexes of the components can be matched to reduce light scattering between the components and improve the transparency.

The limiting viscosity of the material polymer of the oriented polymer film composing the retardation film of the invention is preferably 0.3–2.0 dl/g. A value below this range is a problem because the material becomes brittle and cannot maintain its mechanical strength, and a value above this range is also a problem because the solution viscosity increases excessively leading to die lines during formation of the solution film, or because purification after completion of polymerization becomes more difficult.

The retardation film of the invention is preferably transparent, preferably with a haze value of no greater than 3% and a total light transmittance of 85% or greater. The glass transition temperature of the polymer film material is preferably 100° C. or higher, and more preferably 120° C. or higher.

There may also be added an ultraviolet absorber such as phenylsalicylic acid, 2-hydroxybenzophenone or triphenyl phosphate, a blueing agent for adjustment of the color, an antioxidant, etc.

The retardation film of the invention employs a film of the aforementioned polycarbonate or the like that is oriented by drawing or other means. The production process for the film may be a publicly known melt extrusion process, solution casting process or the like, but solution casting is preferably used from the standpoint of film thickness irregularities and outer appearance. Suitable solvents to be used for solution casting are methylene chloride, dioxolan and the like.

Any publicly known drawing process may be used for drawing, but longitudinal uniaxial drawing is preferred. For improved stretchability, the film may also contain publicly known plasticizers including phthalic acid esters such as dimethyl phthalate, diethyl phthalate and dibutyl phthalate, malic acid esters such as tributyl phosphate, aliphatic dibasic esters, glycerin derivatives, glycol derivatives and the like. During the drawing, the organic solvent used for formation of the film may remain in the film for drawing. The amount of the organic solvent is preferably 1–20 wt % with respect to the solid weight of the polymer.

Additives such as the aforementioned plasticizers or liquid crystals or the like can modify the retardation wavelength dispersion of the retardation film of the invention, but they are preferably added in an amount of no greater than 10 wt % and preferably no greater than 3 wt % with respect to the solid weight of the polymer.

The film thickness of the retardation film is not particularly restricted, but it is preferably from 1 μm to 400 μm. The term "retardation film" is used for the invention, but this will also be referred to as, and includes the meanings of, "film" or "sheet" as well.

A specific chemical structure is an essential condition for a retardation film of the invention having a retardation that is smaller at shorter wavelengths, and much of the retardation wavelength dispersion is determined by the chemical structure; however, it should be noted that this will also vary depending on the stretching conditions, the blend state, etc.

The retardation film of the invention, particularly a single oriented polymer film, may be used to construct a satisfactory quarter-wave plate (λ/4 plate) or half-wave plate (λ/2 plate) with low wavelength dependency, and for such uses it preferably satisfies R(550)≧50 nm and more preferably R(550)≧90 nm; specifically, for use as a λ/4 plate the condition 100 nm ≦ R(550)≦180 nm is preferred, and for use as a λ/2 plate the condition 220≦R(550)≦330 nm is preferred.

Thus, the present invention provides, as one suitable retardation film, a retardation film consisting of a single oriented polycarbonate film, wherein the retardation at wavelengths of 450 nm and 550 nm satisfy the following formula:

$$R(450)/R(550)<1 \tag{1}$$

where R(450) and R(550) represent the in-plane retardation of the oriented polymer film at wavelengths of 450 nm and 550 nm, respectively, and R(550) is at least 50 nm.

Figure 2:
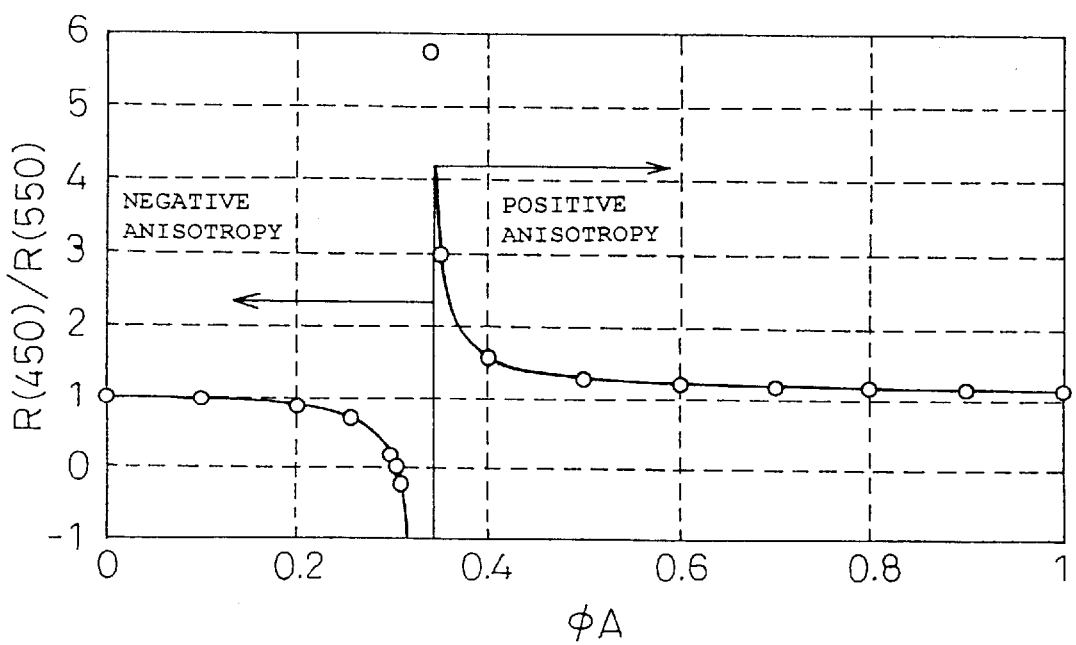
Figure 3:
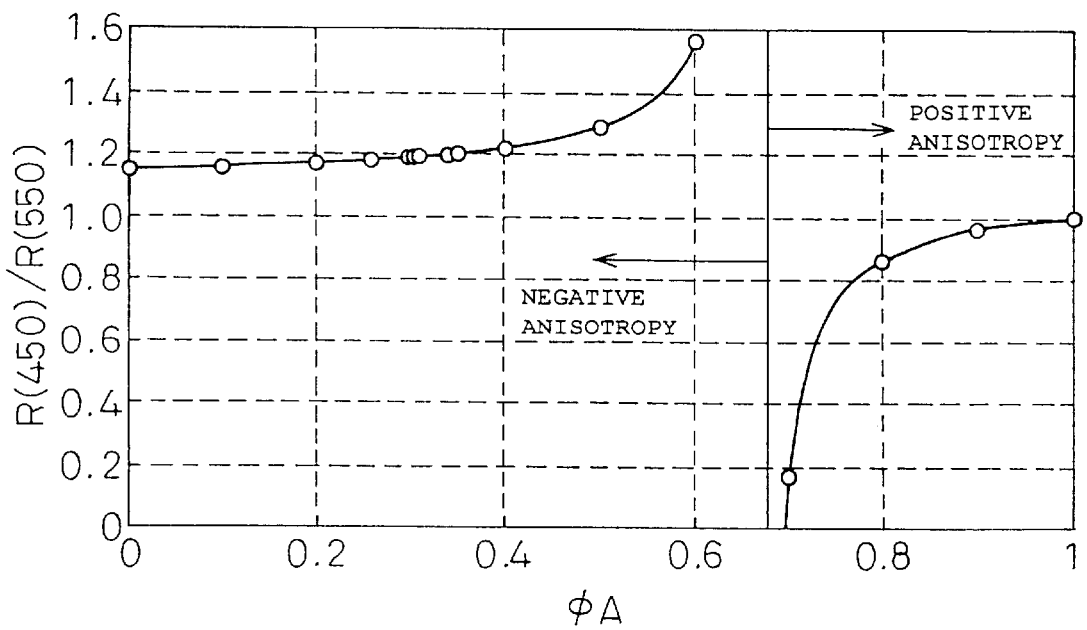
Figure 4:
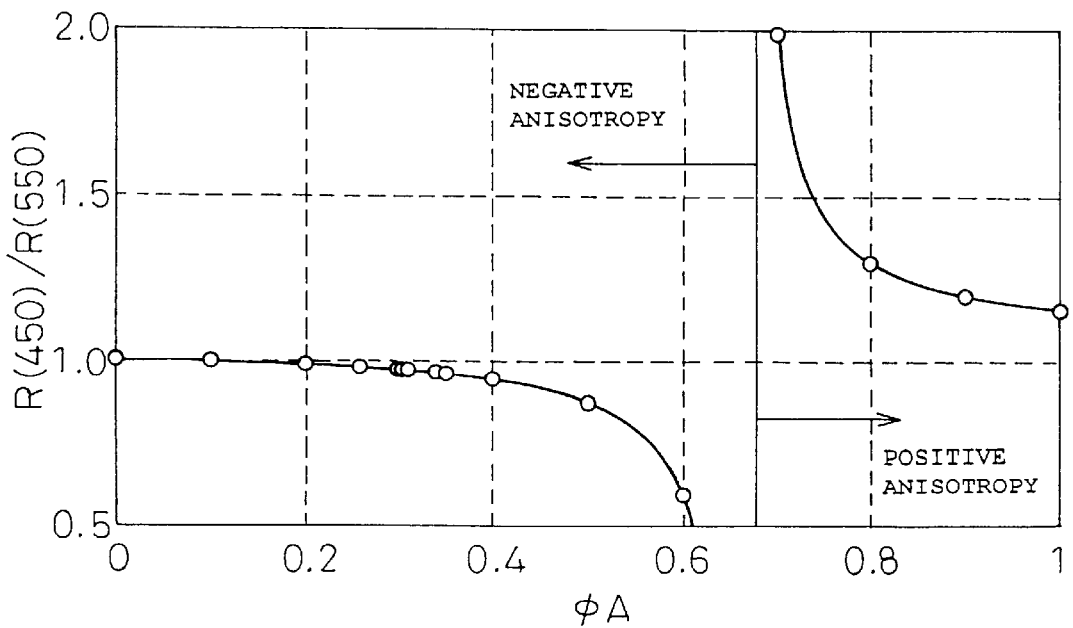

A cellulose acetate film has been disclosed as a retardation film having a smaller retardation at a shorter wavelength at measuring wavelengths of 400–700 nm (FIG. 2 of Japanese Patent Publication No. 2609139). However, it is difficult to control the retardation wavelength dispersion of this cellulose acetate film, and for example, it is difficult to control the retardation wavelength dispersion to provide retardation films with optimum retardation wavelength dispersion depending on various uses (such as a λ/4 plate in a reflective liquid crystal display device). The reason is that cellulose acetate is a material with water absorption of about 4–10%, depending on the acetylation degree, and this is a cause of such problems as hydrolysis, dimensional deformation and orientation relaxation, whereby it becomes difficult to maintain a practical level of retardation and retardation wavelength dispersion for long periods. That is, the problem depends on the characteristics of the material, and cellulose acetate films have therefore been inconvenient in terms of optical durability.

Cellulose acetate films that are used generally have R(550) as small as a few nm (a high acetylation degree and water absorption of about 4%) when used, for example, for polarizing plates or support plates of optical compensation plates. For such uses, no problems arise with the retardation in practice even with orientation relaxation of R(550), and the film can therefore be used as a retardation film. However, if R(550) is any larger, it is not possible to obtain a highly reliable retardation film using a cellulose acetate film. Moreover, even greater reliability is currently desired for uses inside automobiles, for example, where high moisture and heat resistance are required.

The retardation film of the invention can be used as a quarter-wave plate. In this case, it is preferred to use one which has R=Δn·d equal to a quarter wavelength of 550 nm which is the highest visibility in visible light.

In more general terms, to allow a single retardation film of the invention to be used as a wide-band λ/4 plate, the retardation wavelength dispersion is preferably in the ranges of 0.60<R(450)/R(550)<0.97 and
1.01<R(650)/R(550)<1.40 more preferably, 0.65<R(450)/R(550)<0.92 and
1.03<R(650)/R(550)<1.30 and even more preferably, 0.70<R(450)/R(550)<0.87 and
1.04<R(650)/R(550)<1.25.

By using this type of quarter-wave plate as a single polarizing plate, for example, in a reflective liquid crystal display device having a construction with a rear electrode also serving as the reflecting electrode, it is possible to obtain a reflective liquid crystal display device with excellent image quality. The retardation film can also be used on the rear side of a guest-host liquid crystal layer, as viewed by an observer. The role of the retardation film in such situations is that of converting linearly polarized light to circularly polarized light and circularly polarized light to linearly polarized light within the visible light band, and the retardation film of the invention is capable of satisfactorily achieving this purpose.

Thus, as one preferred mode of the invention there is provided a reflective liquid crystal display device having a polarizing plate, a λ/4 plate and a liquid crystal cell containing a liquid crystal layer between two substrates with transparent electrodes in that order, the reflective liquid crystal display device employing as the λ/4 plate a retardation film which is a retardation film comprising a single oriented polycarbonate film, wherein the retardation at wavelengths of 450 nm and 550 nm satisfies the following formula (1):

$$R(450)/R(550)<1 \tag{1}$$

where R(450) and R(550) represent the in-plane retardation of the oriented polymer film at wavelengths of 450 nm and 550 nm, respectively, and R(550) is 100–180 nm.

Such films may also be used in place of a substrate of glass or a polymer film sandwiching the liquid crystal layer of the liquid crystal display device, to serve as both the substrate and the retardation film.

An optional use is as an element that converts circularly polarized light to linearly polarized light in a reflective polarizing plate composed of cholesteric liquid crystals that reflect only circularly polarized light in either the clockwise or counterclockwise direction.

The retardation film of the invention can also be used as a circular polarizing plate or elliptical polarizing plate by attachment to a polarizing plate via a cohesive layer or adhesive layer, or the retardation film may be coated with another material for improved moisture and heat durability or enhanced solvent resistance.

The retardation film of the invention has been developed for the purpose of achieving, with a single oriented polymer film, an ideal λ/4 plate or λ/2 plate with lower birefringence at shorter wavelengths; however, since this generally provides a novel oriented polymer film with lower birefringence at shorter wavelengths and water absorption of under 1 wt %, two retardation films of the invention may be laminated together, or a retardation film of the invention may be laminated with another optical film (retardation film, polarizing plate, optical compensating plate, etc.) to fabricate a λ/4 plate or λ/2 plate that is ideal in a wider wavelength region, for example, in order to obtain a retardation film or optical film which is suitable for a wider range of uses.

According to one aspect of the invention, it is possible to fabricate a retardation film by laminating two or more retardation films that satisfy the formula R(450)/R(550)<1.

According to another aspect of the invention there is provided a laminated retardation film prepared by laminating a λ/4 plate and a λ/2 plate, wherein both retardation films satisfy the following formulae (5) and (6).

$$0.6<R(450)/R(550)<1 \tag{5}$$

$$1<R(650)/R(550)<1.4 \tag{6}$$

With this laminated retardation film, it is possible to achieve virtually perfect circularly polarized light at any wavelength in a measuring wavelength range of 400–700 nm, and preferably 400–780 nm, for linearly polarized light incident to the laminated retardation film, or conversely, to achieve virtually perfect linearly polarized light at any wavelength in a measuring wavelength range of 400–700 nm, for perfect circularly polarized light incident to the laminated retardation film.

As a means of evaluating this property, it was determined whether non-colored blackness was obtained with a polarizing plate, laminated retardation film and reflective plate laminated in that order, i.e. the construction polarizing plate/laminated retardation film/reflective plate, for incident visible light rays of natural polarization from a polarizing plate. With this construction, the polarized state of the light undergoes conversion from natural polarized light→(polarizing plate)→linearly polarized light 1→(laminated retardation film) circularly polarized light→(reflective plate) circularly polarized light→(laminated retardation film) linearly polarized light 2→(polarizing plate), and since the optical axis of the linearly polarized light 2 is shifted 90° with respect to the linearly polarized light 1, it cannot pass through the polarizing plate and the resulting appearance is black. Observation of the degree of coloration of the blackness can serve as an evaluation of the properties of the laminated retardation film.

As a result of this evaluation, non-colored blackness was obtained with a laminated retardation film comprising laminated retardation films satisfying the above formulae (5) and (6). With films not satisfying formulae (5) and (6), the laminated retardation films produced colored blackness.

Both laminated retardation films more preferably satisfy the following formulae:

0.70<R(450)/R(550)<0.99 and 1.01<R(650)/R(550)<1.30 and even more preferably 0.75<R(450)/R(550)<0.96 and 1.02<R(650)/R(550)<1.20.

Figure 5:
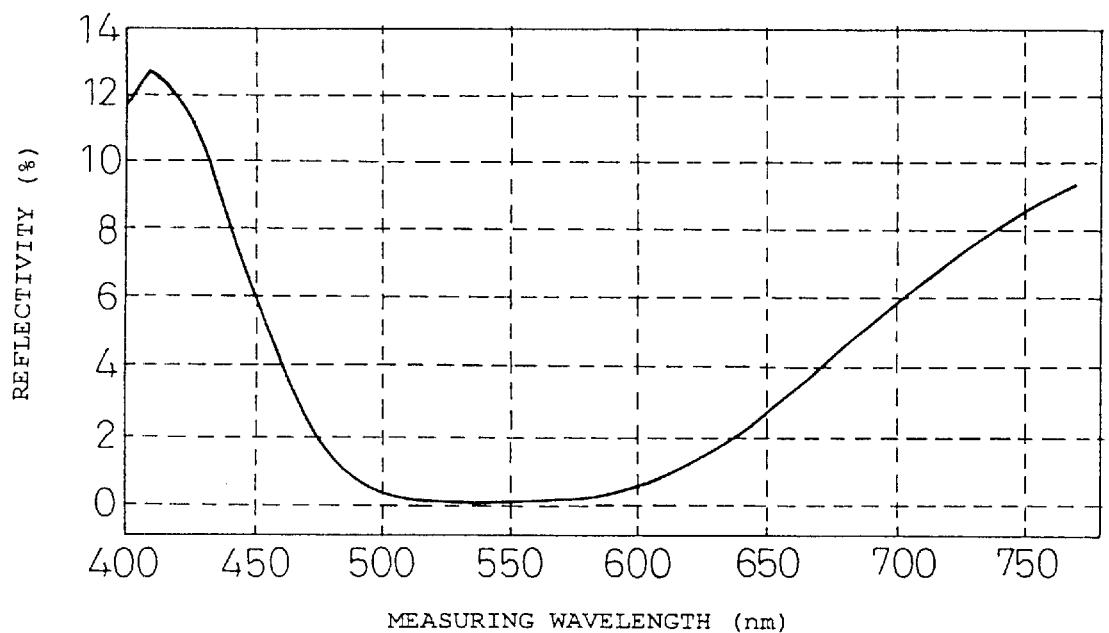
FIG. 5 is a graph showing simulation results for coloration of a laminated retardation film that does not satisfy the conditions of the present invention.

The laminated retardation film of the invention is obtained by laminating two retardation films whose of the optical axes of the optical materials in this construction are shown in Table 2. As seen in FIG. 5, the reflectivity is particularly larger at the shorter wavelength end and longer wavelength end, so that the ideal blackness cannot be obtained.

TABLE 2

| Polarizing plate polarization axis angle (°) | 0 |
|---|---|
| λ/2 plate retardation axis angle (°) | 75 |
| λ/4 plate retardation axis angle (°) | 15 |

The two retardation films used for the invention are preferably transparent, preferably with a haze value of no greater than 3% and a total light transmittance of 85% or greater. Lamination of two such retardation films is preferred to prepare a laminated retardation film with a haze value of no greater than 3% and a total light transmittance of 85% or greater.

The film thickness of each retardation film is preferably 1–400 μm.

The K value is an index of the three-dimensional refractive index anisotropy of a retardation film, and it varies depending on the R value and the film thickness, while the optimum value therefor will differ depending on the use. The preferred range may be given in terms of $N_z=(n_x-n_z)/(n_x-n_y)$, which is another index of the three-dimensional anisotropy instead of the K value, as between 0.3–1.5 for a uniaxially stretched film such as a λ/4 plate or λ/2 plate. Particularly when $N_z=0.5$, there is almost no change in retardation even if the angle of incidence to the retardation film changes from the front incidence. In the case of a biaxially stretched film, it is preferably from −100 to 100. The three-dimensional refractive indexes $n_x$, $n_y$ and $n_z$ for $N_z$ are those used in the calculation of the K value.

The laminated retardation film of the invention may retardation wavelength dispersion values satisfy the above formulae (5) and (6), i.e. a half-wave plate and a quarter-wave plate, preferably in such a manner that their optical axes form an angle of from 50° to 70°. When the angle of attachment is outside of this range it is not possible to obtain satisfactory properties.

The laminated retardation film can roughly achieve R=λ/4 (nm) at measuring wavelengths of 400–700 nm. However, this property does not strictly have to be always ideal for a single-polarizing plate-type reflective liquid crystal display device, for example, and when incorporated into a liquid crystal display device it is important to match the liquid crystal layer or other optical members.

There are no particular restrictions on polymer materials to be used as retardation films so long as they satisfy the above formulae (5) and (6), and representative examples thereof were provided above; however, the aforementioned polycarbonates with fluorene skeletons are most preferred. The half-wave plate and quarter-wave plate in the laminated retardation film of the invention are also preferably made of the same polymer material from the standpoint of productivity.

As will be demonstrated in greater detail by the examples which follow, in order to determine the results when the retardation wavelength dispersion value of the laminated retardation film does not satisfy the above formulae (5) and (6), such as when R(450)/R(550)=0.5 and R(650)/R(550)=1.5, a 2×2 optical matrix was used for a simulation, the results of which are shown in FIG. 5. The calculation for the construction: polarizing plate/laminated retardation film/reflective plate is a calculation for light from the polarizing plate entering in a direction normal to the polarizing plate, and exiting in the normal direction. The polarizing plate has a 100% degree of polarization and the reflective plate is an ideal specular reflection plate. The angles be combined with a polarizing plate through a cohesive layer or adhesive layer to form a circularly polarizing plate, or another material may be coated on the retardation film for improved moisture and heat resistance, or enhanced solvent resistance. In the case of a circularly polarizing plate, the order of the first retardation film in the laminated retardation film of the invention is important, and the construction: polarizing plate//half-wave plate//quarter-wave plate is necessary. The circularly polarizing plate can circularly polarize incident light in a wide wavelength range, for light incident on the polarizing plate side.

Light exiting the laminated retardation film of the invention having the construction: half-wave plate//quarter-wave plate is circularly polarized light, in a wide wavelength range for linearly polarized light incident to the half-wave plate side, and light exiting it is linearly polarized light, in a wide wavelength range for circularly polarized light incident to the quarter-wave plate side.

By using this type of retardation film in a liquid crystal display device, and particularly a single polarizing plate-type reflective liquid crystal display device, it is possible to obtain a display device with excellent image quality. The reflective liquid crystal display device may be one having a construction in the order: polarizing plate, retardation film, transparent electrode-mounted substrate, liquid crystal layer, scattering reflection electrode-mounted substrate; one having a construction in the order: polarizing plate, scattering plate, retardation film, transparent electrode-mounted substrate, liquid crystal layer, specular reflection electrode-mounted substrate; one having a construction in the order: polarizing plate, retardation film, transparent electrode-mounted substrate, liquid crystal layer, transparent electrode-mounted substrate, reflective layer; or the like. As an option, the quarter-wave plate may be used in a liquid crystal display device serving as both a transparent type and reflective type. The construction of such a liquid crystal display device may be, for example, the following: polarizing plate, retardation film, transparent electrode-mounted substrate, liquid crystal layer, reflective/transparent electrode-mounted substrate, retardation film, polarizing plate, backlight system. Also, for example, it may be used as an element to convert circularly polarized light to linearly polarized light in a reflective polarizing plate made of cholesteric crystals that reflect only circularly polarized light in either the clockwise or counter-clockwise direction, to obtain satisfactory linearly polarized light across a wide band.

The retardation film of the invention may be used as a quarter-wave plate to be used in the optical head of an optical recording device. In particular, since the retardation film can provide quarter wavelength retardation for multiple wavelengths, it can contribute to reducing the number of retardation films in an optical head employing multiple laser light sources.

FIGS. 7–13 show examples of constructions of laminated retardation films and liquid crystal display devices employing retardation films according to the invention.

EXAMPLES

Evaluation Methods

The material property values described throughout the present specification were obtained by the following evaluation methods.

(1) Measurement of R and K Values

The retardation R value which is the product of the birefringence Δn and the film thickness d, and the K value which is obtained from the three-dimensional refractive indexes, were measured with the spectral negative when $R(550)<0$.

(2) Measurement of Total Light Transmittance and Haze

Measurement was made with an integrating sphere light ray transmittance measuring apparatus according to "Plastics Optical Property Testing Method" of the Japan Industrial Standard JIS K 7105. The evaluating apparatus used was a "COH-300A" color difference/turbidity measuring instrument by Nippon Denshoku, KK.

(3) Measurement of Water Absorption

Measurement was made according to "Plastics Water Absorption and Boiled Water Absorption Testing Method" of JIS K 7209, except that the film thickness of the dried film was 130±50 μm. The test piece was a 50 mm square piece, the water temperature was 25° C., and the weight change was measured after immersing the sample in water for 24 hours. The units are given as percentages.

(4) Measurement of Polymer Copolymerization Ratio

Measurement was made by proton NMR with a "JNM-alpha600" by Nippon Denshi K.K. Particularly in the case of a copolymer of bisphenol A and biscresolfluorene, heavy benzene was used as the solvent and calculation was made from the proton strength ratio for each methyl group.

(5) Measurement of Polymer Glass Transition Temperature (Tg)

Measurement was made using a "DSC2920 Modulated DSC" by TA Instruments. The measurement was conducted not after film formation but after resin polymerization, in a flake or chip state.

(6) Measurement of Polymer Limiting Viscosity

An Ubbellohde viscosity tube was used to determine the limiting viscosity at 20° C. in methylene chloride.

(7) Measurement of Film Color Tone

A "U-3500" spectrophotometer by Hitachi Laboratories was used to determine the b* value of the L*a*b* color specification system according to JIS Z-8729, with a 2° ellipsometer "M150" by JASCO Corporation. The R value was measured with the incident light rays and the film surface in an orthogonal state, where $R=\Delta n \cdot d=(n_x-n_y)\cdot d$. The K value was determined by varying the angle between the incident light rays and the film surface and measuring the retardation value at each angle, calculating $n_x$, $n_y$ and $n_z$ as the three-dimensional refractive indexes by curve fitting using a publicly known refractive index ellipsoid formula, and substituting the values into the formula: $K=(n_z-(n_x+n_y)/2)\cdot d$. This requires the separate parameter of the average refractive index $n=(n_x+n_y+n_z)/3$, and this was determined by measuring the refractive index n at measuring wavelengths λ of 500, 550, 590 and 640 nm using an "Abbe refractometer 2-T" by Atago, Inc., which is an Abbe refractometer equipped with a spectrophotometric light source, and finding the refractive indexes at the other wavelengths from 4 points using the Cauchy formula ($n=a+b/\lambda^2+C/\lambda^4$; where a, b and c are the fitting parameters). The units for both the K and R values are nm. The variables $n_x$, $n_y$ and $n_z$ are defined as follows.

$n_x$: Refractive index in primary stretching direction in the film plane $n_y$: Refractive index in direction orthogonal to the primary stretching direction in the film plane $n_z$: Refractive index in the direction normal to the film surface (The primary stretching direction is the drawing direction in the case of uniaxial drawing, and the direction of drawing that gives the highest degree of orientation, in the case of biaxial drawing; in terms of chemical structure, it indicates the direction of orientation of the polymer main chain.)

The R values at each wavelength given in the following tables are the measured values. The refractive index anisotropy is positive when $R(550)>0$, and visual field and a c light source.

(8) Measurement of Film Thickness

Measurement was made with an electronic microprobe by Anritsu Corp.

(9) Measurement of Photoelastic Constant

This was measured at a measuring wavelength of 590 nm, using the spectral ellipsometer "M150" by JASCO Corporation.

The monomer structures of the polycarbonates used in the following examples and comparative examples are given below.

(10) Heat Durability Test

The film was placed in two constant temperature baths and allowed to stand under conditions [1] and (2] ([1] 80° C., dry, 1000 hours; [2] 60° C., 60% RH, 1000 hours), after which the film was removed and measurements (1), (2) and (7) above were repeated.

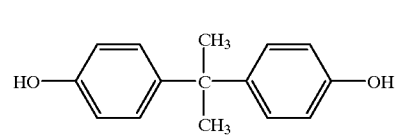

[A]

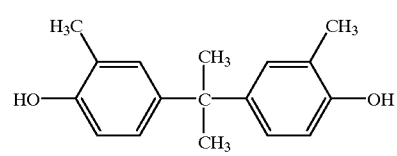

[B]

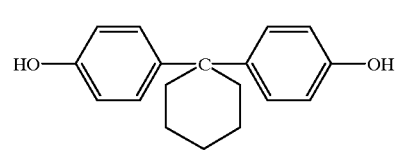

[C]

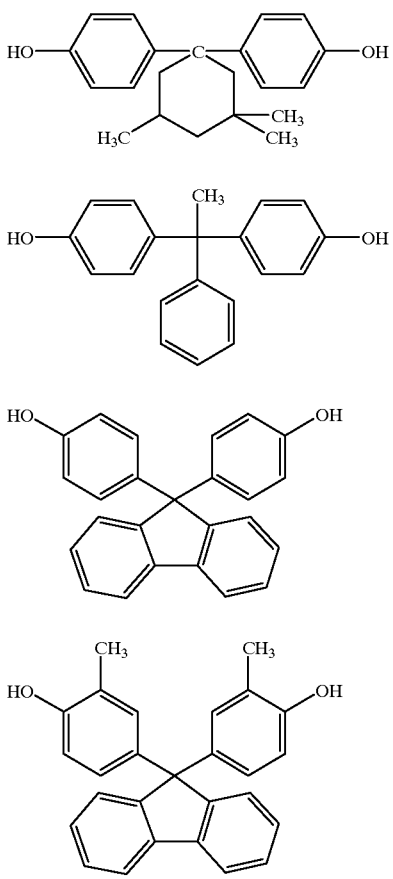

Table 3 shows the R(450)/R(550) and the refractive index anisotropy upon uniaxial stretching at near Tg, for stretched films of homopolymers of phosgene with [A] to [G] above, and polystyrene [PS] and polyphenylene oxide [PPO]. Due to the difficulty of film formation with [F], [G] or [PPO] alone, for [F] and [G] the values were extrapolated from copolymers with small varying amounts of [A] added. For [PPO], the value was extrapolated from copolymers with small varying amounts of [PS] added.

TABLE 3

|  | [A] | [B] | [C] | [D] | [E] | [F] | [G] | [PPO] | [PS] |
|---|---|---|---|---|---|---|---|---|---|
| R(450)/R(550) | 1.08 | 1.07 | 1.08 | 1.08 | 1.07 | 1.14 | 1.14 | 1.15 | 1.06 |
| Refractive index anisotropy | + | + | + | + | + | − | − | + | − |

Example 1

A sodium hydroxide aqueous solution and ion-exchange water were charged into a reaction vessel equipped with a stirrer, thermometer and reflux condenser, and then monomers [A] and [G] having the structures shown above were dissolved in the molar ratios given in Table 1 and a small amount of hydrosulfite was added. After then adding methylene chloride, phosgene was blown in at 20° C. for about 60 minutes. After adding p-tert-butylphenol for emulsification, triethylamine was added and the mixture was stirred at 30° C. for about 3 hours to complete the reaction. Upon completion of the reaction, the organic phase was separated off and the methylene chloride was evaporated to obtain a polycarbonate copolymer. The compositional ratio of the obtained copolymer was roughly the same as the monomer charging ratio.

The copolymer was dissolved in methylene chloride to prepare a doping solution with a solid content of 15 wt %. A cast film was formed from this doping solution, and was subjected to free-width uniaxial stretching to a factor of 1.9 at a temperature of 218° C. The solvent content of the cast film prior to drawing was 2%, and the ratio of the width of the film in the drawing zone to the length in the direction of drawing was 1:1.2.

Figure 14:
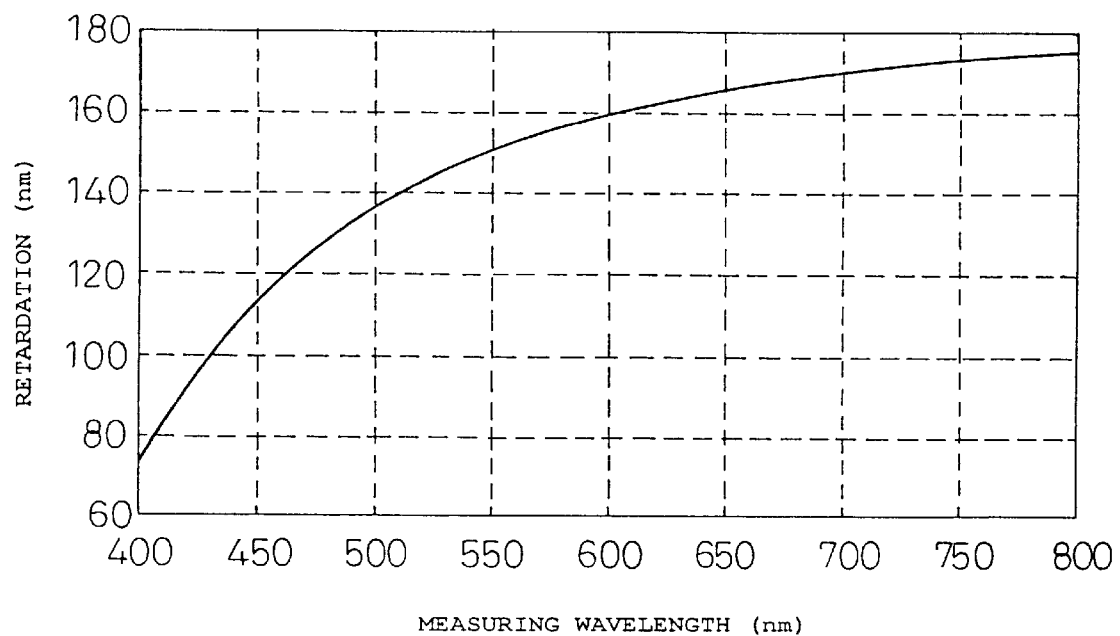
FIG. 14 is a graph showing the relationship between wavelength and the retardation of the retardation film of Example 1.

The measurement results are summarized in Table 4. The relationship between the retardation and the wavelength dispersion is shown in FIG. 14. The film had a smaller retardation with shorter measuring wavelength, with the largest in-plane refractive index in the direction of drawing, whereby positive refractive index anisotropy was confirmed.

The photoelastic constant of the unstretched cast film was $35 \times 10^{-13}$ cm$^2$/dyne.

This was followed by heat durability testing, and virtually no changes were found.

Example 2

The unstretched cast film prior to stretching that was fabricated in Example 1 was subjected to biaxial drawing to a factor of 1.1 at 220° C., in both the lengthwise and widthwise directions, one after the other. The measurement results are summarized in Table 4.

This was followed by heat durability testing, and virtually no changes were found.

Example 3

A polycarbonate copolymer was obtained by the same method as Example 1, except that the monomers listed in Table 4 were used. The compositional ratio of the resulting copolymer was roughly the same as the monomer charging ratio. A film was formed in the same manner as Example 1, and a retardation film was obtained by free-width uniaxial drawing to a factor of 1.7 at a temperature of 218° C. The solvent content of the cast film prior to drawing was 0.5%.

The measurement results are summarized in Table 4. The film had a smaller retardation with shorter measuring wavelength, and positive refractive index anisotropy was confirmed.

This was followed by heat durability testing, and virtually no changes were found.

Example 4

The unstretched cast film prior to drawing that was fabricated in Example 2 was subjected to biaxial drawing to a factor of 1.1. at 220° C., in both the lengthwise and widthwise directions, one after the other. The measurement results are summarized in Table 4.

This was followed by heat durability testing, and virtually no changes were found.

Example 5

A polycarbonate copolymer was obtained by the same method as Example 1, except that the monomers listed in Table 4 were used. The compositional ratio of the resulting copolymer was roughly the same as the monomer charging ratio. A film was formed in the same manner as Example 1, and a retardation film was obtained by free-width uniaxial drawing to a factor of 1.7 at a temperature of 218° C. The solvent content of the cast film prior to drawing was 0.2%.

The measurement results are summarized in Table 4. The film was confirmed to have positive refractive index anisotropy.

This was followed by heat durability testing, and virtually no changes were found.

Example 6

The copolymer prepared in Example 3 was dissolved in methylene chloride so that the proportions of [A] and [G] were the same as in Example 1. The concentration of the solution was 15 wt % in terms of solid content, but it was transparent with no turbidity, and the film prepared from the solution had a haze of 0.5%, showing the two copolymers to be compatible. When the cast film was drawn under the same conditions as Example 1, the wavelength dispersion relationship for values K and R was found to be roughly equal to that in Example 1.

This was followed by heat durability testing, and virtually no changes were found.

Example 7

A polycarbonate copolymer was obtained by the same method as Example 1, except that the monomers listed in Table 4 were used. The compositional ratio of the resulting copolymer was roughly the same as the monomer charging ratio. A film was formed in the same manner as Example 1, and a retardation film was obtained by uniaxial drawing to a factor of 2 at a temperature of 240° C. The measurement results are summarized in Table 4. The film had a smaller retardation with shorter measuring wavelength, and positive refractive index anisotropy was confirmed.

TABLE 4

Optical properties of retardation films in examples

|  | Example 1 | Example 2 | Example 3 | Example 4 | Example 5 | Example 7 |
| --- | --- | --- | --- | --- | --- | --- |
| Monomer 1 structure | [A] | [A] | [A] | [A] | [A] | [A] |
| (charging mole %) | (32) | (32) | (40) | (40) | (45) | (29) |
| Monomer 2 structure | [G] | [G] | [G] | [G] | [G] | [F] |
| (charging mole %) | (68) | (68) | (60) | (60) | (55) | (71) |
| Tg (° C.) | 227 | 227 | 218 | 218 | 213 | 234 |
| Limiting viscosity [η] | 0.792 | 0.792 | 0.701 | 0.701 | 0.672 | 0.655 |
| R (450) | 113.6 | 2.5 | 149.7 | 3.1 | 102.2 | 91.8 |
| R (550) | 151.0 | 3.3 | 160.3 | 3.1 | 104.3 | 102.1 |
| R (650) | 166.1 | 3.6 | 162.7 | 3.0 | 104.3 | 107.4 |
| R (450)/R (550) | 0.752 | 0.758 | 0.934 | 1.000 | 0.980 | 0.899 |
| R (650)/R (550) | 1.100 | 1.091 | 1.015 | 0.968 | 1.000 | 1.052 |
| K (450) | −54.2 | −27.2 | −74.7 | −60.6 | −50.9 | −44.1 |
| K (550) | −74.5 | −46.8 | −80.2 | −64.2 | −50.8 | −52.1 |
| K (650) | −82.3 | −67.1 | −81.1 | −64.4 | −50.7 | −53.5 |
| K (450)/K (550) | 0.728 | 0.581 | 0.931 | 0.944 | 1.002 | 0.846 |
| K (650)/K (550) | 1.105 | 1.434 | 1.011 | 1.003 | 0.998 | 1.027 |
| Average refractive index (450) | 1.635 | 1.635 | 1.627 | 1.627 | 1.628 | 1.633 |
| Average refractive index (550) | 1.625 | 1.625 | 1.621 | 1.621 | 1.621 | 1.624 |
| Average refractive index (650) | 1.621 | 1.621 | 1.615 | 1.615 | 1.615 | 1.622 |
| Water absorption (%) | 0.2 | 0.2 | 0.2 | 0.2 | 0.2 | 0.2 |
| Haze (%) | 0.7 | 0.9 | 0.9 | 0.8 | 0.9 | 0.9 |
| Total light transmittance (%) | 91.0 | 91.2 | 91.2 | 91.1 | 90.2 | 90.2 |
| b* | 0.7 | 0.7 | 0.7 | 0.6 | 1.0 | 1.0 |
| Stretched film thickness (μm) | 100 | 110 | 110 | 120 | 100 | 100 |

Example 8

A polycarbonate copolymer was obtained by the same method as Example 1, except that the monomers listed in Table 5 were used. The compositional ratio of the resulting copolymer was roughly the same as the monomer charging ratio. A film was formed in the same manner as Example 1, and a retardation film was obtained by uniaxial drawing to a factor of 1.6 at a temperature of 210° C.

The measurement results are summarized in Table 5. The film had a smaller retardation with shorter measuring wavelength, and positive refractive index anisotropy was confirmed.

Example 9

A polycarbonate copolymer was obtained by the same method as Example 1, except that the monomers listed in Table 5 were used. The compositional ratio of the resulting copolymer was roughly the same as the monomer charging ratio. A film was formed in the same manner as Example 1, and a retardation film was obtained by uniaxial drawing to a factor of 1.6 at a temperature of 230° C.

The measurement results are summarized in Table 5. The film had a smaller retardation with shorter measuring wavelength, and positive refractive index anisotropy was confirmed.

Example 10

A polycarbonate copolymer was obtained by the same method as Example 1, except that the monomers listed in Table 5 were used. The compositional ratio of the resulting copolymer was roughly the same as the monomer charging ratio. A film was formed in the same manner as Example 1, and a retardation film was obtained by stretching to a factor of 1.7 at a temperature of 230° C.

The optical property measurement results are summarized in Table 5. The film had a smaller retardation with shorter measuring wavelength, and positive refractive index anisotropy was confirmed.

Example 11

A polycarbonate copolymer was obtained by the same method as Example 1, except that the monomers listed in Table 5 were used. The compositional ratio of the resulting copolymer was-roughly the same as the monomer charging ratio. A film was formed in the same manner as Example 1, and a retardation film was obtained by drawing to a factor of 1.6 at a temperature of 240° C.

The measurement results are summarized in Table 5. The film had a smaller retardation with shorter measuring wavelength, and positive refractive index anisotropy was confirmed.

TABLE 5

Optical properties of retardation films in examples

| | Example 8 | Example 9 | Example 10 | Example 11 |
|---|---|---|---|---|
| Monomer 1 structure | [B] | [C] | [D] | [E] |
| (charging mole %) | (60) | (37) | (40) | (55) |
| Monomer 2 structure | (G) | [G] | [G] | [G] |
| (charging, mole %) | (40) | (63) | (60) | (45) |
| Tg (° C.) | 190 | 232 | 244 | 225 |
| Limiting viscosity [η] | 0.821 | 0.632 | 0.692 | 0.998 |
| R (450) | 58.5 | 39.1 | 42.0 | 116.6 |
| R (550) | 72.8 | 53.9 | 49.9 | 141.8 |
| R (650) | 80.08 | 59.3 | 52.6 | 150.3 |
| R (450)/R (550) | 0.803 | 0.725 | 0.841 | 0.822 |
| R (650)/R (550) | 1.100 | 1.101 | 1.054 | 1.060 |
| K (450) | −28.0 | −18.9 | −20.5 | −58.0 |
| K (550) | −34.2 | −26.1 | −25.1 | −70.3 |
| K (650) | −40.1 | −28.9 | −26.7 | −75.2 |
| K (450)/K (550) | 0.819 | 0.724 | 0.817 | 0.825 |
| K (650)/K (550) | 1.173 | 1.107 | 1.064 | 1.070 |
| Average refractive index (450) | 1.612 | 1.623 | 1.618 | 1.625 |
| Average refractive index (550) | 1.603 | 1.618 | 1.609 | 1.612 |
| Average refractive index (650) | 1.599 | 1.612 | 1.601 | 1.603 |
| Water absorption (%) | 0.2 | 0.2 | 0.2 | 0.2 |
| Haze (%) | 0.8 | 0.9 | 0.9 | 0.8 |
| Total light transmittance (%) | 90.5 | 90.7 | 90.8 | 90.2 |
| b* | 0.9 | 0.8 | 0.7 | 0.7 |
| Stretched film thickness (μm) | 80 | 90 | 90 | 100 |

Example 12

Polystyrene (obtained from Wako Junyaku Kogyo, KK.) as a polymer with negative refractive index anisotropy and polyphenylene oxide (poly(2,6-dimethyl-1,4-phenylene oxide) obtained from Wako Junyaku Kogyo, KK.) as a polymer with positive refractive index anisotropy, were dissolved in chloroform in proportions of 70 and 30 wt %, respectively, to prepare a doping solution with a solid content of 18 wt %. A cast film was formed from the doping solution and was uniaxially drawn to a factor of 3 at a temperature of 130° C. The glass transition temperature of the film was 125° C.

The optical property measurement results are summarized in Table 6. The film had a smaller retardation with shorter measuring wavelength, and negative refractive index anisotropy was confirmed.

Figure 15:
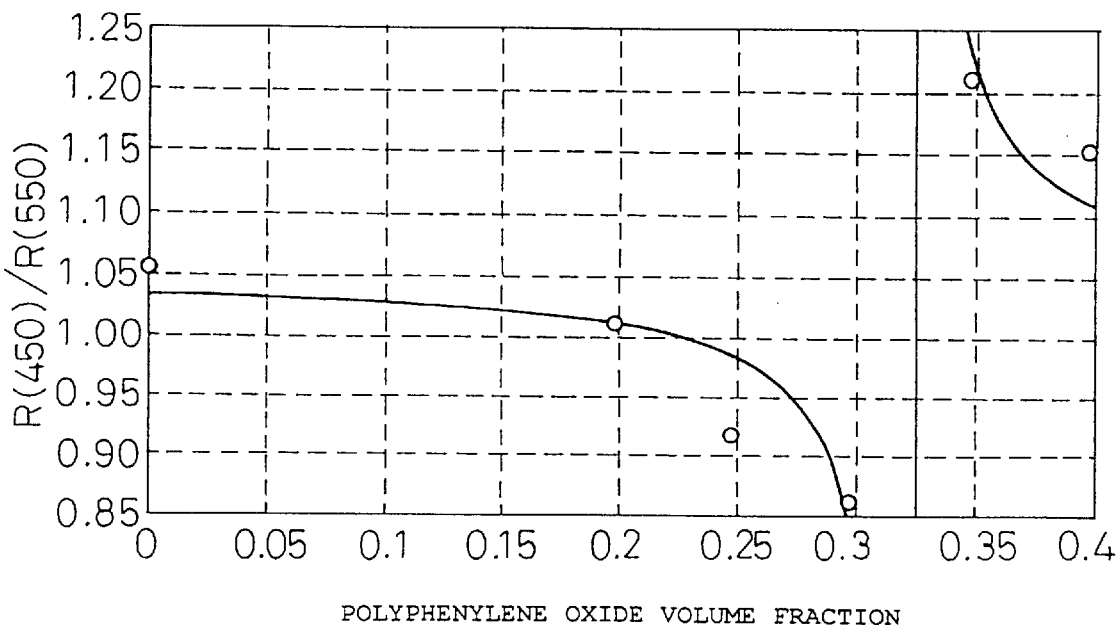
FIGS. 15 and 16 are graphs showing the relationship between birefringent wavelength dispersion coefficient of the retardation film of Example 12 and the volume fraction of the polymer components.

For reference, FIG. 15 shows the relationship between the birefringence wavelength dispersion coefficient and the polyphenylene oxide volume fraction with different blend ratios of polystyrene and polyphenylene oxide. It can be seen that the optical anisotropy is negative in the area of low polyphenylene oxide, and an area exists where the birefringence wavelength dispersion coefficient is smaller than 1. On the other hand, the value is larger than 1 in the area of high polyphenylene oxide and positive refractive index anisotropy.

Figure 16:
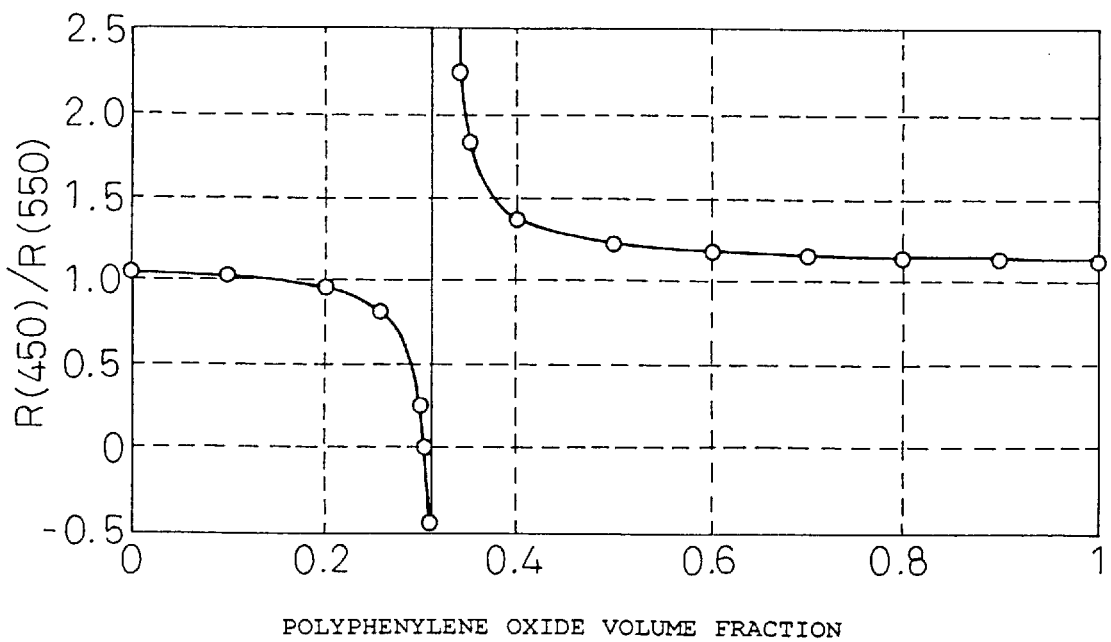

FIG. 16 shows the relationship between the volume fraction and birefringence wavelength dispersion coefficient such as shown in FIG. 15, as calculated using the above-mentioned formula (c). FIG. 16 is given by using −0.10 and 0.21 as the values of the intrinsic birefringence at a wavelength of 550 nm for polystyrene and polyphenylene oxide (see D. Lefebvre, B. Jasse and L. Monnerie, Polymer 23, 706–709, 1982). FIG. 15 and FIG. 16 are well matched. The densities used of polystyrene and polyphenylene oxide were 1.047 and 1.060 g/cm³, respectively.

TABLE 6

Optical properties of retardation films in examples

| | Example 12 |
|---|---|
| Tg (° C.) | 134 |
| R (450) | −119.1 |
| R (550) | −138.0 |
| R (650) | −147.8 |
| R (450)/R (550) | 0.863 |
| R (650)/R (550) | 1.071 |
| Water absorption (%) | 0.3 |
| Haze (%) | 0.7 |
| Total light transmittance (%) | 91.1 |
| b* | 1.0 |
| Stretched film thickness (μm) | 140 |

Example 13

The film formed in Example 1 was evaluated by incorporation into a single polarizing plate reflective liquid crystal display device mounted in a "Game Boy Color", which is a portable game device by Nintendo, Inc.

The construction, as viewed by an observer, is: polarizing plate/retardation film formed in Example 1/glass substrate/ITO transparent electrode/alignment film/twisted nematic liquid crystals/alignment film/metal electrode (and reflective film)/glass substrate. The adhesive layers between each of the layers are omitted. The films were attached at angles that displayed white with the voltage off, and the tint was evaluated visually. The retardation film functions as a λ/4 plate. This commercial product employs two polycarbonate films made of a homopolymer of bisphenol A and having different retardation values, but it was confirmed that when only one film of Example 1 was used, there was low coloration especially when displaying black, and this resulted in high contrast and excellent visibility.

Example 14

The film formed according to Example 1 was placed on a reflective polarizing plate comprising cholesteric liquid crystals, and the tint was evaluated with the construction: commercially available backlight/cholesteric liquid crystal layer/film of Example 1/polarizing plate. The film of Example 1 functions as a λ/4 plate. The angle between the retardation axis of the film and the polarization axis was 45°. The light emitted from the polarizing plate was white with little coloration.

Example 15

Using an optical compensation film employing a UV-cured discotic liquid crystal layer, incorporated into the liquid crystal display device of a commercial liquid crystal monitor-equipped video camera, the discotic liquid crystal layer was peeled off from the support plate and attached to the retardation film formed in Example 2 via a cohesive layer. This was attached back to the liquid crystal display device, i.e. only the support substrate was replaced with the product of Example 2, and the device was used as a liquid crystal monitor; whereas the white display sections appeared brown-colored when viewed at an angle from the horizontal direction of the monitor in its commercial product state, the construction described here resulted in a much lower degree of coloration and hence excellent visibility. In addition, there was no loss of front contrast.

Comparative Example 1

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.5 at a temperature of 240° C. The measurement results are summarized in Table 7. The film was confirmed to have a larger retardation with shorter measuring wavelength in terms of absolute value.

Comparative Example 2

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.2 at a temperature of 170° C. The measurement results are summarized in Table 7. The film was confirmed to have a larger retardation with shorter measuring wavelength in terms of absolute value.

Comparative Example 3

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.5 at a temperature of 240° C. The measurement results are summarized in Table 7. The film was confirmed to have a larger retardation with shorter measuring wavelength in terms of absolute value.

Comparative Example 4

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.2 at a temperature of 165° C. The measurement results are summarized in Table 7. The film was confirmed to have a larger retardation with shorter measuring wavelength in terms of absolute value.

Comparative Example 5

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.5 at a temperature of 230° C. The optical property measurement results are summarized in Table 7. The film was confirmed to have a larger retardation with shorter measuring wavelength in terms of absolute value.

Comparative Example 6

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.1 at a temperature of 160° C. The measurement results are summarized in Table 7. The film was confirmed to have a larger retardation with shorter measuring wavelength in terms of absolute value.

Comparative Example 7

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.3 at a temperature of 240° C. The measurement results are summarized in Table 7. The film was confirmed to have a larger retardation with shorter measuring wavelength in terms of absolute value.

Comparative Example 8

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.2 at a temperature of 175° C. The measurement results are summarized in Table 7. The film was confirmed to have a larger retardation with shorter measuring wavelength in terms of absolute value.

Comparative Example 9

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.2 at a temperature of 260° C. The measurement results are summarized in Table 7. The film was confirmed to have a larger retardation with shorter measuring wavelength in terms of absolute value.

Comparative Example 10

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.1 at a temperature of 170° C. The optical property measurement results are summarized in Table 7. The film was confirmed to have a larger retardation with shorter measuring wavelength in terms of absolute value.

Comparative Example 11

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.5 at a temperature of 260° C. The measurement results are summarized in Table 7. The film was confirmed to have a larger retardation with shorter measuring wavelength in terms of absolute value.

Comparative Example 12

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by drawing to a factor of 1.2 at a temperature of 180° C. The measurement results are summarized in Table 7. The film was confirmed to have a larger retardation with shorter measuring wavelength in terms of absolute value.

Comparative Example 13

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by uniaxial drawing to a factor of 1.1 at a temperature of 160° C. The measurement results are summarized in Table 7. The film was confirmed to have a larger retardation with shorter measuring wavelength in terms of absolute value.

Comparative Example 14

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by uniaxial drawing to a factor of 1.1 at a temperature of 175° C. The measurement results are summarized in Table 7. The film was confirmed to have a larger retardation with shorter measuring wavelength in terms of absolute value.

Comparative Example 15

A polycarbonate copolymer was obtained by the same method except that the monomers listed in Table 7 were used. The compositional ratio of the resulting copolymer was roughly the same as the monomer charging ratio. A film was formed in the same manner as Example 1, and a retardation film was obtained by uniaxial drawing to a factor of 1.1 at a temperature of 170° C. The measurement results are summarized in Table 7. The film was confirmed to have a larger retardation with shorter measuring wavelength in terms of absolute value.

TABLE 7

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Monomer 1 structure (charging mole %) | [A] (19) | [A] (90) | [A] (10) | [A] (90) | [B] (19) | [B] (90) | [C] (10) | [C] (90) | [D] (10) | [D] (90) |
| Monomer 2 structure (charging mole %) | [G] (81) | [G] (10) | [F] (90) | [F] (10) | [G] (81) | [G] (10) | [G] (90) | [G] (10) | [G] (90) | [G] (10) |
| R (450) | −94.9 | 224.0 | −96.4 | 370.1 | −128.6 | 236.8 | −57.8 | 285.4 | −124.9 | 171.7 |
| R (550) | −68.4 | 210.3 | −67.8 | 348.2 | −87.9 | 223.4 | −43.8 | 267.0 | −95.0 | 160.3 |
| R (650) | −63.8 | 203.1 | −62.6 | 335.3 | −76.7 | 216.9 | −37.4 | 254.5 | −81.8 | 152.9 |
| R (450)/R (550) | 1.298 | 1.065 | 1.317 | 1.063 | 1.463 | 1.060 | 1.320 | 1.069 | 1.315 | 1.071 |
| R (650)/R (550) | 0.873 | 0.966 | 0.855 | 0.963 | 0.872 | 0.971 | 0.854 | 0.953 | 0.861 | 0.954 |
| K (450)/K (550) | 1.297 | 1.066 | 1.315 | 1.064 | 1.461 | 1.059 | 1.321 | 1.068 | 1.313 | 1.072 |
| K (650)/K (550) | 0.870 | 0.963 | 0.852 | 0.962 | 0.873 | 0.972 | 0.855 | 0.952 | 0.660 | 0.962 |
| Haze (%) | 1.1 | 0.6 | 1.3 | 0.7 | 1.1 | 0.8 | 1.2 | 0.7 | 1.4 | 0.9 |
| Total light transmittance (%) | 90.0 | 91.8 | 90.2 | 91.5 | 90.3 | 91.7 | 90.1 | 91.1 | 90.8 | 91.3 |
| Stretched film thickness (μm) | 90 | 90 | 50 | 60 | 55 | 60 | 60 | 70 | 50 | 50 |

TABLE 7-continued

|  | Comp. Ex. 11 | Comp. Ex. 12 | Comp. Ex. 13 | Comp. Ex. 14 | Comp. Ex. 15 |
|---|---|---|---|---|---|
| Monomer 1 structure (charging mole %) | [E] (19) | [E] (90) | [A] (100) | [C] (100) | [E] (100) |
| Monomer 2 structure (charging mole %) | [G] (81) | [G] (10) |  |  |  |
| R (450) | −164.7 | 127.3 | 319.5 | 74.6 | 75.3 |
| R (550) | −134.0 | 120.1 | 295.8 | 69.2 | 70.6 |
| R (650) | −116.0 | 116.3 | 282.8 | 66.4 | 68.2 |
| R (450)/R (550) | 1.229 | 1.060 | 1.080 | 1.078 | 1.066 |
| R (650)/R (550) | 0.866 | 0.968 | 0.956 | 0.959 | 0.965 |
| K (450)/K (550) | 1.230 | 1.061 | 1.080 | 1.081 | 1.067 |
| K (650)/K (550) | 0.866 | 0.962 | 0.951 | 0.958 | 0.966 |
| Haze (%) | 1.3 | 0.2 | 1.5 | 0.4 | 0.7 |
| Total light transmittance (%) | 90.2 | 91.3 | 91.0 | 90.7 | 90.7 |
| Stretched film thickness (μm) | 50 | 50 | 75 | 80 | 100 |

Example 16

A sodium hydroxide aqueous solution and ion-exchange water were charged into a reaction vessel equipped with a stirrer, thermometer and reflux condenser, and then monomers A and G having the structures shown above were dissolved in the molar ratios given in Table 8, and a small amount of hydrosulfite was added. After then adding methylene chloride, phosgene was blown in at 20° C. for about 60 minutes. After adding p-tert-butylphenol for emulsification, triethylamine was added and the mixture was stirred at 30° C. for about 3 hours to complete the reaction. Upon completion of the reaction, the organic phase was separated off and the methylene chloride was evaporated to obtain a polycarbonate copolymer. The compositional ratio of the obtained copolymer was roughly the same as the monomer charging ratio.

The copolymer was dissolved in methylene chloride to prepare a doping solution with a solid content of 20 wt %. A cast film was formed from this doping solution, and was subjected to uniaxial drawing to form a retardation film for λ/4 and λ/2 (nm) at a measuring wavelength of λ=550 nm.

The film was attached at the angle shown in Table 8, to form an optical multilayer film comprising a polarizing plate//half-wave plate//quarter-wave plate//reflective plate. An adhesive was used between each optical film.

Figure 6:
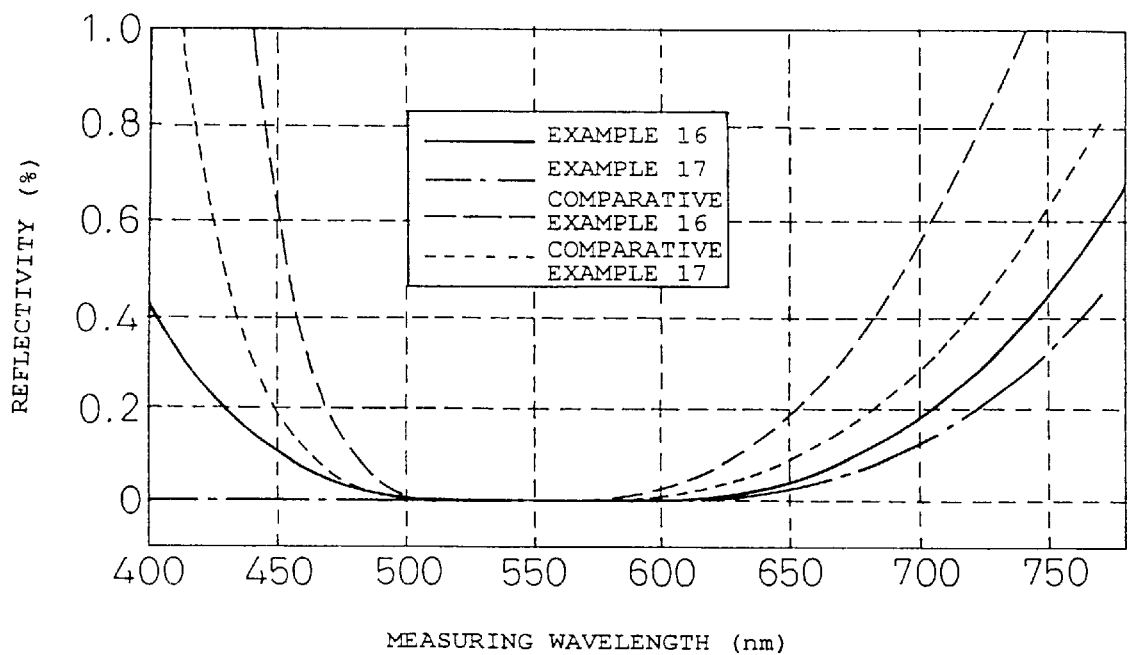
FIG. 6 is a graph showing the colorations for the laminated retardation films of Examples 16 and 17 and Comparative Examples 16 and 17.
Figure 7:
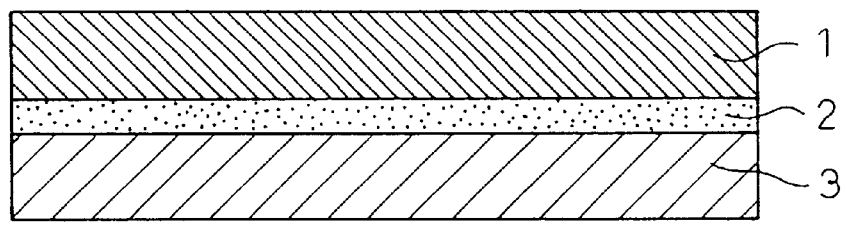
FIGS. 7 to 10 show examples of laminated retardation films, where
Figure 8:
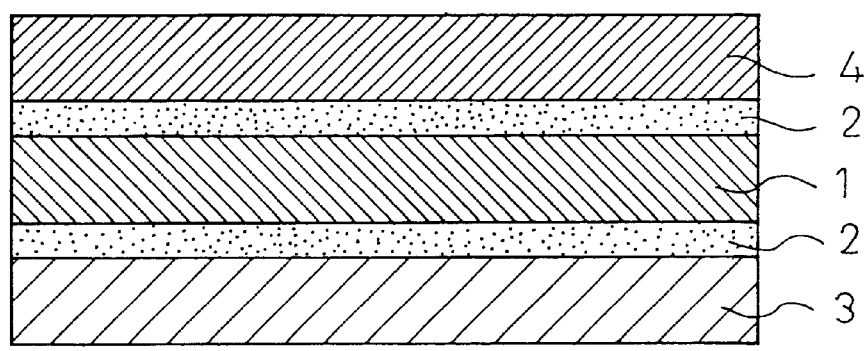
Figure 9:
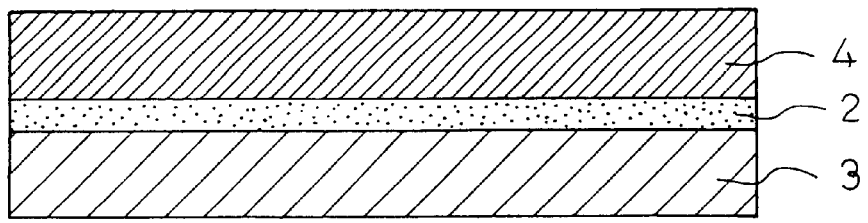
Figure 10:
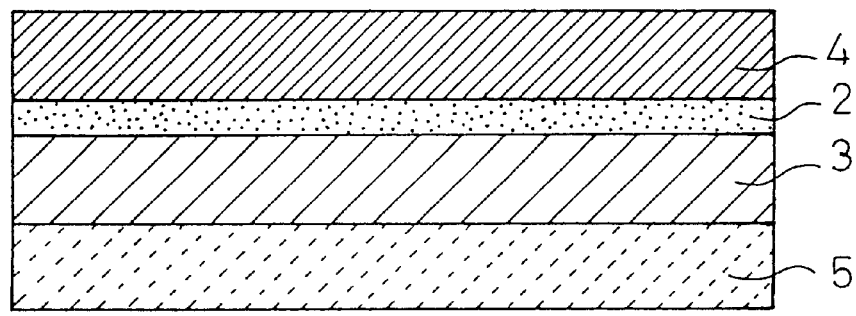
Figure 11:
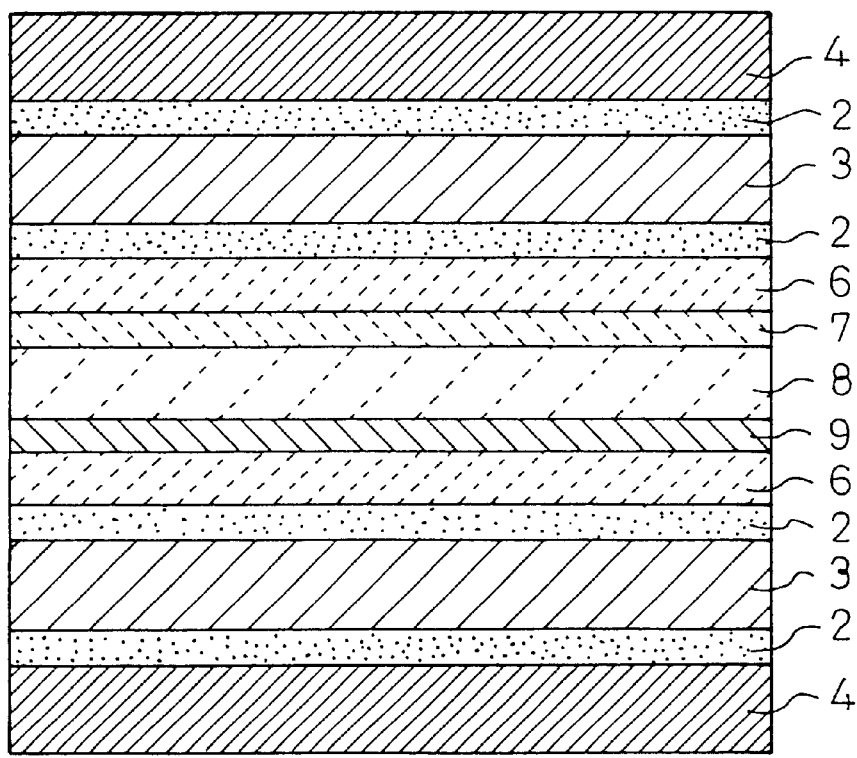
FIGS. 11 to 13 show examples of liquid crystal display devices, where FIG. 11 has the construction: polarizing plate 4//λ/4 plate 3//glass plate 6//liquid crystal layer 8//glass plate 6//λ/4 plate 3//polarizing plate 4//backlight system 10.
Figure 12:
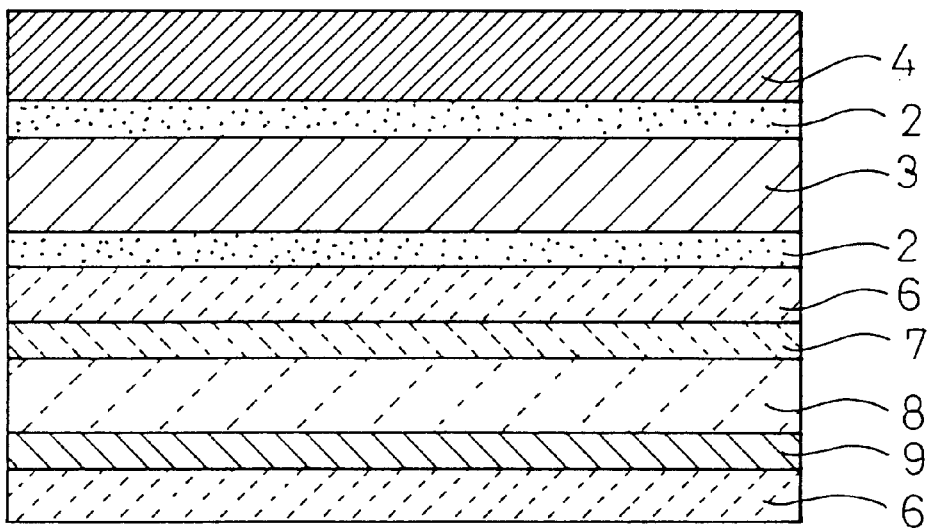
Figure 13:
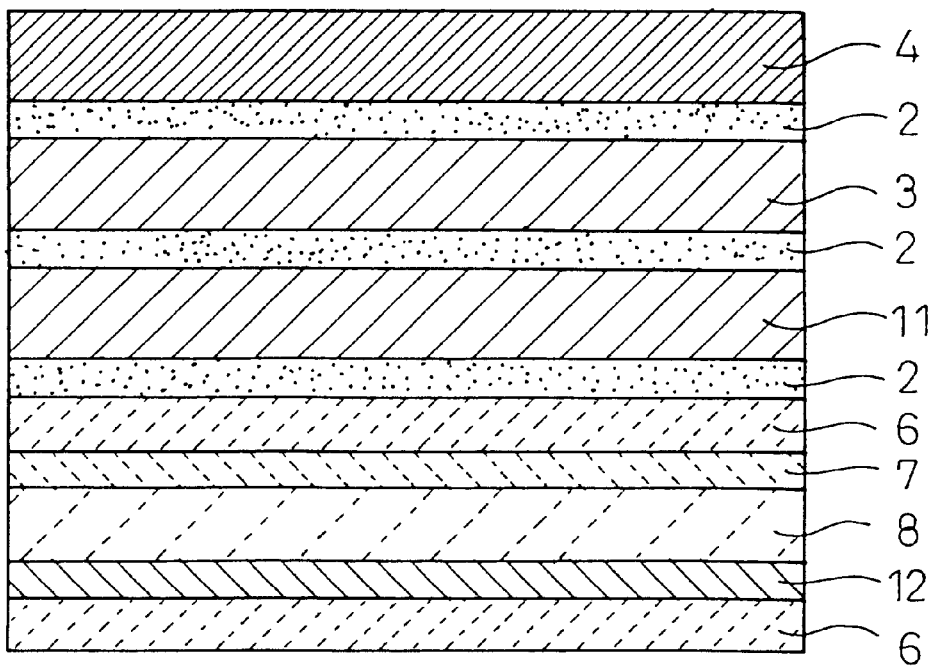

FIG. 6 shows a summary of the reflection spectrum of this optical multilayer film. There is a complete absence of coloration, and blackness with low reflectivity is achieved in the case where the reflectivity is 0 in the total wavelength range in FIG. 6; however, with the laminated retardation film of the invention, the reflectivity was lower than the comparative examples described later as seen in FIG. 6, giving a very excellent condition of blackness. The optical multilayer film was also visually examined and found to be black with no coloration.

Example 17

A polycarbonate copolymer was obtained by the same method as Example 16 except that the monomers listed in Table 7 were used. The compositional ratio of the resulting copolymer was roughly the same as the monomer charging ratio. A half-wave plate and quarter-wave plate were formed in the same manner as Example 16, and these were attached at the angle shown in Table 1 to prepare an optical multilayer film comprising a polarizing plate//half-wave plate//quarter-wave plate//reflective plate.

FIG. 6 shows a summary of the reflective spectrum for this optical multilayer film. As seen in FIG. 6, a very excellent condition of blackness was achieved compared to the comparative examples. The optical multilayer film was also visually examined and found to be black with no coloration.

TABLE 8

|  | Example 16 | Example 17 | Comp. Ex. 16 | Comp. Ex. 17 |
|---|---|---|---|---|
| Monomer 1 structure (charging mole %) | A (42) | A (34) | A (100) | — |
| Monomer 2 structure (charging mole %) | G (58) | G (66) | — | — |
| R (450)/R (550) | 0.963 | 0.849 | 1.078 | 1.010 |
| R (650)/R (550) | 1.008 | 1.041 | 0.960 | 0.997 |
| K (450)/K (550) | 0.964 | 0.855 | 1.071 | 1.010 |
| K (650)/K (550) | 1.007 | 1.039 | 0.971 | 0.998 |
| Polarizing plate polarization axis angle (°) | 0 | 0 | 0 | 0 |
| λ/2 plate retardation axis angle (°) | 75 | 75 | 75 | 75 |
| λ/4 plate retardation axis angle (°) | 15 | 15 | 15 | 15 |

Comparative Example 16

A polycarbonate homopolymer was obtained by the same method as Example 16 except that the monomers listed in Table 8 were used. A half-wave plate and quarter-wave plate were formed in the same manner as Example 16, and these were attached at the angles shown in Table 8 to prepare an optical multilayer film comprising a polarizing plate//half-wave plate//quarter-wave plate//reflective plate.

FIG. 6 shows a summary of the reflective spectrum for this optical multilayer film. The optical multilayer film was also visually examined and found to have coloration in the blackness.

Comparative Example 17

A half-wave plate and quarter-wave plate were formed in the same manner as Example 16, using the norbornane resin "ARTON G" by JSR, KK, and these were attached at the angles shown in Table 8 to prepare an optical multilayer film comprising a polarizing plate//half-wave plate//quarter-wave plate//reflective plate.

FIG. 6 shows a summary of the reflective spectrum for this optical multilayer film. The optical multilayer film was also visually examined and found have coloration in the blackness, compared to Examples 16 and 17.

INDUSTRIAL APPLICABILITY

According to the present invention it was possible to obtain a retardation film having a smaller birefringence with shorter measuring wavelengths, even with a single film. A retardation film having such birefringence wavelength dispersion properties and a retardation to ¼ wavelength at a measuring wavelength of 550 nm will function as a retardation film that converts circularly polarized light to linearly polarized light and linearly polarized light to circularly polarized light in a wide wavelength range, and it can therefore be applied to a single polarizing plate- or guest/host-type reflective liquid crystal display device, or to a reflective polarizing element that reflects circularly polarized light in one direction, in order to provide high image quality liquid crystal display devices and high performance reflective polarizing elements with satisfactory productivity.

What is claimed is:

1. A retardation film, characterized in that said retardation film is a single oriented film, the retardation at wavelengths of 450 nm and 550 nm of said retardation film satisfies the following formulae (1) and/or (2), and the water absorption of said retardation film is no greater than 1%:

$$R(450)/R(550)<1 \qquad (1)$$

$$K(450)/K(550)<1 \qquad (2)$$

where R(450) and R(550) represent the in-plane retardation of the oriented polymer film at wavelengths of 450 nm and 550 nm, respectively, and 450 nm and 550 nm, respectively, and K(450) and K(550) are the values calculated by K=[n_x+ n_y)/2]×d (where n_x, n_y and n_z represent the three-dimensional refractive indexes of the oriented polymer film as the refractive indexes in the direction of the x-axis, y-axis and z-axis, respectively, and d represents the thickness of the film) for the oriented polymer film at a wavelength of 450 nm an 550 nm, respectively.

2. A retardation film according to claim 1, wherein the retardation at wavelengths of 450 nm, 550 nm and 650 nm satisfies the following formulae (3) and (4):

$$0.6<R(450)/R(550)<0.97 \qquad (3)$$

$$1.01<R(650)/R(550)<1.4 \qquad (4)$$

where R(650) represents the in-plane retardation of the oriented polymer film at a wavelength of 650 nm.

3. A retardation film according to claim 1 or 2, wherein the retardation is smaller with a shorter wavelength in the wavelength range of 400–700 nm.

4. A retardation film according to claim 1, which comprises an oriented polymer film wherein
(1) the film is composed of a polymer comprising a monomer unit of a polymer with positive refractive index anisotropy (hereunder referred to as "first monomer unit") and a monomer unit of a polymer with negative refractive index anisotropy (hereunder referred to as "second monomer unit"),
(2) R(450)/R(550) for the polymer based on said first monomer unit is smaller than R(450)/R(550) for the polymer based on said second monomer unit, and
(3) the film has positive refractive index anisotropy.

5. A retardation film according to claim 1, which comprises an oriented polymer film wherein
(1) the film is composed of a polymer comprising a monomer unit that forms a polymer with positive refractive index anisotropy (hereunder referred to as "first monomer unit") and a monomer unit that forms a polymer with negative refractive index anisotropy (hereunder referred to as "second monomer unit"),
(2) R(450)/R(550) for the polymer based on said first monomer unit is larger than R(450)/R(550) for the polymer based on said second monomer unit, and
(3) the film has negative refractive index anisotropy.

6. A retardation film according to claim 1, wherein said oriented polymer film is made of a polymer material with a glass transition temperature of 120° C. or higher.

7. A retardation film according to claim 1, wherein said oriented polymer film contains a polycarbonate with a fluorene skeleton.

8. A retardation film according to claim 1, which is an oriented polymer film comprising copolymer and/or blend of polycarbonates in which 30–90 mole percent of the total consists of a repeating unit represented by the following general formula (I):

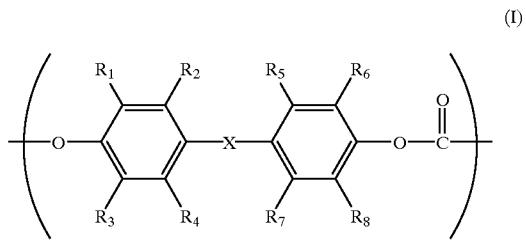

where $R_1$–$R_8$ are each independently selected from among hydrogen, halogen atoms and hydrocarbon groups of 1–6 carbon atoms, and X is

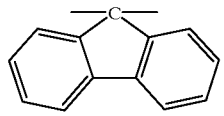

and 70–10 mole percent of the total consists of a repeating unit represented by the following general formula (II):

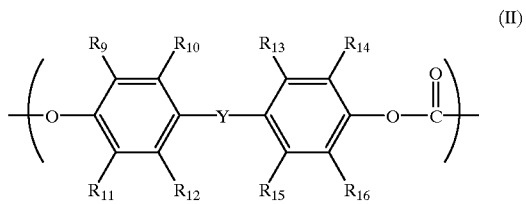

where $R_9$–$R_{16}$ are each independently selected from among hydrogen, halogen atoms and hydrocarbon groups of 1–22 carbon atoms, and Y is

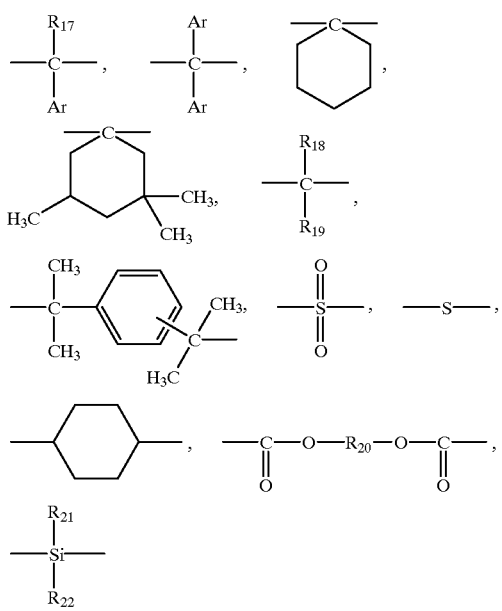

or —R$_{23}$—, where in Y, R$_{17}$–R19, R$_{21}$ and R$_{22}$ are each independently selected from among hydrogen, halogen atoms and hydrocarbon groups of 1–22 carbon atoms, R$_{20}$ and R$_{23}$ are selected from among hydrocarbon groups of 1–20 carbon atoms, and Ar is selected from among aryl groups of 6–10 carbon atoms.

9. A retardation film according to claim 8, which is an oriented polymer film comprising copolymer and/or blend of polycarbonates in which 35–85 mole percent of the total consists of a repeating unit represented by the following general formula (III):

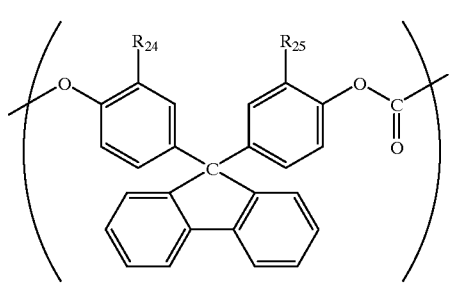
(III)

where R$_{24}$ and R$_{25}$ are each independently selected from among hydrogen and methyl, and 65–15 mole percent of the total consists of a repeating unit represented by the following general formula (IV):

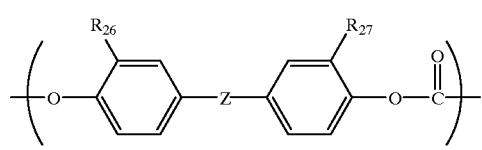
(IV)

where R$_{26}$ and R$_{27}$, are each independently selected from among hydrogen and methyl, and Z is selected from among

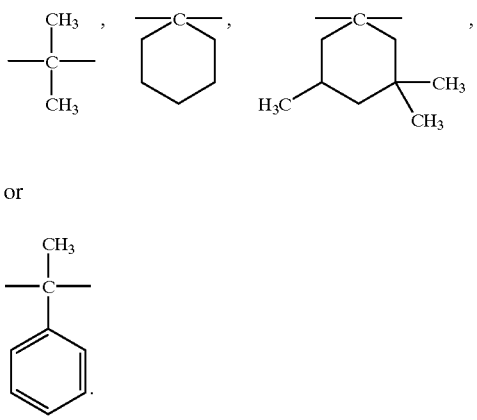

or $$\begin{array}{c} CH_3 \\ | \\ -C- \\ | \\ \text{phenyl} \end{array}$$

10. A retardation film according to claim 5, which is a blended oriented polymer film in which said polymer with positive refractive index anisotropy is poly(2,6-dimethyl-1,4-phenyleneoxide) and said polymer with negative refractive index anisotropy is polystyrene, wherein the polystyrene content is from 67 wt % to 75 wt %.

11. A retardation film according to claim 1, wherein the b* value representing the object color is 1.3 or smaller.

12. A retardation film according to claim 1, which is a λ/4 plate.

13. A retardation film according to claim 1, which is a λ/2 plate.

14. A retardation film according to claim 12 or 13, wherein R(550)≧90 nm.

15. A laminated retardation film prepared by laminating a λ/4 plate and a λ/2 plate, wherein both the λ/4 plate and λ/2 plate are a retardation film according to claim 1.

16. A laminated retardation film according to claim 15, wherein the angle formed between the optical axes of the λ/4 plate and λ/2 plate is in the range of 50°–70°.

17. A circular polarizing plate or elliptical polarizing plate prepared by laminating a polarizing plate with a retardation film according to claim 1.

18. A circular polarizing plate or elliptical polarizing plate prepared by laminating a reflective polarizing plate with a retardation film according to claim 1.

19. A circular polarizing plate or elliptical polarizing plate prepared by laminating a polarizing plate with a retardation film according to claim 1 and a reflective polarizing plate.

20. A circular polarizing plate or elliptical polarizing plate according to claim 18 or 19, wherein said reflective polarizing plate has a function of reflecting only circularly polarized light rotated in one direction.

21. A circular polarizing plate or elliptical polarizing plate according to claim 20, wherein said reflective polarizing plate is composed of a cholesteric liquid crystal polymer.

22. A liquid crystal display device provided with a retardation film according to claim 1.

23. A liquid crystal display device according to claim 22, which is a reflective liquid crystal display device.

24. A liquid crystal display device according to claim 22, wherein said retardation film is a viewing angle compensating plate.

25. A retardation film which is a retardation film comprised of a single polycarbonate oriented film, wherein the retardation at wavelengths of 450 nm and 550 nm satisfies the following formula (1):

$$R(450)/R(550)<1 \qquad (1)$$

where R(450) and R(550) represent the in-plane retardation of the oriented polymer film at wavelengths of 450 nm and 550 nm, respectively, and R(550) is at least 50 nm.

26. A reflective liquid crystal display device provided with a polarizing plate, a λ/4 plate and a liquid crystal cell containing a liquid crystal layer between two substrates each with an electrode with at least one of the electrodes being a transparent electrode in that order, the reflective liquid crystal display device employing as the λ/4 plate a retardation film comprising a single oriented polycarbonate film, wherein the retardation at wavelengths of 450 nm and 550 nm satisfies the following formula (1):

$$R(450)/R(550)<1$$

where R(450) and R(550) represent the in-plane retardation of the oriented polymer film at wavelengths of 450 nm and 550 nm, respectively, and R(550) is 100–180 nm.

* * * * *